United States Patent [19]
Fujita

[11] Patent Number: 5,923,641
[45] Date of Patent: Jul. 13, 1999

[54] DISK CARTRIDGE

[75] Inventor: Minoru Fujita, Ibaraki, Japan

[73] Assignees: Hitachi Maxell, Ltd., Osaka-fu; ALPS Electric Co., Ltd., Tokyo; Nintendo Co., Ltd., Kyoto-fu, all of Japan

[21] Appl. No.: 08/675,883

[22] Filed: Jul. 5, 1996

[30] Foreign Application Priority Data

| Jul. 7, 1995 | [JP] | Japan | 7-196053 |
| Sep. 21, 1995 | [JP] | Japan | 7-242836 |
| Jun. 27, 1996 | [JP] | Japan | 8-167217 |

[51] Int. Cl.$^6$ ................................................. G11B 23/03
[52] U.S. Cl. ........................................... 369/291; 360/133
[58] Field of Search ................................. 369/289, 291; 360/132, 133

[56] References Cited

U.S. PATENT DOCUMENTS

| 4,455,642 | 6/1984 | Inaba | 369/291 |
| 4,797,770 | 1/1989 | Takahashi | 369/291 |
| 5,034,844 | 7/1991 | Shiba et al. | 369/291 |
| 5,077,625 | 12/1991 | Shiba et al. | 360/133 |
| 5,166,922 | 11/1992 | Akiyama et al. | 369/291 |
| 5,175,726 | 12/1992 | Imokawa | 369/291 |
| 5,319,630 | 6/1994 | Earman et al. | 369/291 |
| 5,381,402 | 1/1995 | Lee et al. | 369/291 |
| 5,546,376 | 8/1996 | Taniyama | 369/291 |
| 5,570,341 | 10/1996 | Sandell et al. | 369/291 |
| 5,615,070 | 3/1997 | Bordes | 369/291 |
| 5,768,074 | 6/1998 | Sumner et al. | 369/291 |

FOREIGN PATENT DOCUMENTS

| 197519 | 1/1993 | China . |
| 336 637 | 10/1989 | European Pat. Off. . |
| 348 216 | 12/1989 | European Pat. Off. . |
| 385 740 | 9/1990 | European Pat. Off. . |
| 3-194783 | 8/1991 | Japan | 369/291 |
| 4-42754 | 7/1992 | Japan . |
| 4-66078 | 10/1992 | Japan . |
| 88/09992 | 12/1988 | WIPO . |
| 89/08312 | 9/1989 | WIPO . |

*Primary Examiner*—David L. Ometz
*Attorney, Agent, or Firm*—Nixon & Vanderhye P.C.

[57] ABSTRACT

A disk-like recording medium is rotatably accommodated in a case 1 configured by opposing an upper half 2 to a lower half 3. A lower head insert hole is formed so as to extend from an approximate center of an edge surface of an inserting direction to the drive apparatus to a direction oppsite to the inserting direction. An upper accommodating portion 21 having an enlarged shape is formed on an upper surface of the upper half 2 and approximately directly overlies the lower head insert hole. Thus, an edge surface opening which connects with the lower head insert hole is formed on an edge surface of the case on a side of the inserting direction to the drive apparatus. Normally, the edge surface opening is closed by a short side portion 42 of a shutter 4 and the lower head insert hole is closed by a long side portion 41 of the shutter 4. When the disk cartridge is inserted in the drive apparatus, the shutter 4 slides in a direction perpendicular to the inserting direction to open the edge surface opening and the lower head insert hole. In this situation, an upper head on the drive apparatus side is inserted in the upper head accommodating portion 21 in an approximately horizontal direction. A lower head on the drive apparatus side is inserted from a lower side in the lower head insert hole. That is, the disk cartridge is loaded in the drive apparatus in a horizontal state.

14 Claims, 24 Drawing Sheets

DISK CARTRIDGE

BACKGROUND OF THE INVENTION

1. Field of the Invention

The present invention relates to disk cartridges and more specifically to a disk cartridge which rotatably accommodates a disk-like recording medium such as a magnetic disk, a CD-ROM, an MOD, etc., and which issued in a drive apparatus.

2. Description of the Background Art

A conventional disk cartridge is disclosed, for example in Japanese Patent Publication No. 4-42754 (hereinafter "conventional art 1"), for example. In the conventional art 1, a case is constructed from an upper half and a lower half. The case is formed in a rectangular shape with a notch portion at a corner of an end of an inserting direction and head insert holes on each of the upper half and the lower half. A U-shaped shutter (or a channel shaped showing a sectional shape of steel) is openably formed to cover the head insert holes, and a disk-like recording medium is accommodated in the case. In use, the disk cartridge of the conventional art 1 is horizontally inserted in a drive apparatus to be loaded by going downward to a thickness direction (a vertical direction) when it is completely inserted. The shutter is normally biased to a closed position by a spring. Then, when the disk cartridge of the conventional art 1 is loaded in the drive apparatus, the shutter is opened while the disk cartridge is being horizontally inserted. When the disk cartridge is completely inserted, the notch portion at the end of the inserting direction can distinguish whether the insertion is reversed or not to ensure normal loading. After the loading is completed, heads inside the drive apparatus cross a cartridge front edge portion (a shutter front edge portion) being opened upward and downward and approach the disk in a position corresponding to the head insert holes.

Another disk cartridge is disclosed in Japanese Patent Publication No. 4-66078 (hereinafter "conventional art 2"). In the conventional art 2, an edge surface portion of a shutter corresponding to a head insert hole when the shutter is opened is formed to be narrow in width so as to be thinner than other portions.

Since the disk cartridge of the conventional art 1 is inserted so that an upper head and a lower head on the drive apparatus interpose the disk-like recording medium from above and below from the head insert holes of the upper half and the lower half, respectively, when the disk cartridge is loaded in the drive apparatus, a space between the upper head and the lower head has to be large, which makes it difficult to make the drive apparatus thin. Also, since stroke of an up/down motion of the heads becomes large, the disk cartridge has a disadvantage that the precision of the head positioning is reduced by the up/down motion. Specifically, the head positioning accuracy has a large influence when the medium accommodated in the case is capable of high-density recording. Furthermore, it is impossible to detect whether the insertion is in a normal direction or in a reverse direction until the disk is almost completely inserted in the drive apparatus, which may cause damage to the apparatus by pushing the disk without knowing of the reverse insertion.

On the other hand, the conventional art 2 is much the same as the conventional art 1 in the point that the disk cartridge is inserted so that an upper head and a lower head interpose a disk-like recording medium from above and below from head insert holes of an upper half and a lower half, respectively. The difference is just that an upper head stroke and a lower head stroke can be slightly smaller than the conventional art 1.

Moreover, both in the conventional art 1 and the conventional art 2, since the head insert holes are formed on both sides of the upper half and the lower half, a problem rises that the case easily breaks down because of a low strength of the case. As a result, when the case receives an outer stress, for example, when the cartridge case is stepped on or wrenched, the disk-like recording medium and maybe scratched, damaging recorded data.

SUMMARY OF THE INVENTION

Therefore, a main object of the present invention is to provide a disk cartridge capable of minimizing a stroke of an up/down motion of an upper head and a lower head when the disk cartridge is installed in a drive apparatus and the heads are inserted to make the drive apparatus thin, and improving a head positioning accuracy.

It is another object of the present invention to provide a disk cartridge capable of keeping a sufficient strength even if a head insert hole is formed on one side thereof, and preventing a reverse insertion to a drive apparatus prior to complete insertion.

That is, a first aspect of the present invention is directed to a disk cartridge, capable of being used in a drive apparatus which has an upper head and an opposedly arranged lower head, and which is formed so as to read recorded information from a disk-like recording medium inserted between the upper head and the lower head. The disk cartridge has a flat rectangular shape with the disk-like recording medium rotatably held in a space, wherein the disk cartridge comprises:

- a case formed by opposing an inner side of an upper halt to an inner side of a lower half and defining an outer shape of the disk cartridge;
- a lower head insert hole formed in the lower half so as to extend from an approximate center of a prescribed edge surface to a center portion of the disk cartridge;
- an upper head accommodating portion formed in the upper half on an upper portion which directly overlies the lower head insert hole, and having an enlarged shape compared with other portions of a main surface of the upper half. The upper head accommodating portion has on the prescribed edge surface an edge surface opening which connects with the lower head insert hole and into which the upper head can be inserted; and
- a shutter formed in an approximately L-shaped cross-section having a short side portion and a long side portion perpendicular to each other. The shutter is operable to close the edge surface opening with the short side portion, to close the lower head insert hole with the long side portion, and to slidably open when the case is inserted in the drive apparatus.

As described above, in the first aspect of the present invention, the head insert hole is formed only in the lower half for the lower head to be inserted, and the head accommodating portion is formed in the upper half so as to extend further than other surfaces. Then, the head accommodating portion and the head insert hole are joined to form the edge surface opening on the edge surface of the case in the vicinity of the head insert hole. Furthermore, the L-shaped shutter is slidably formed so as to cover the edge surface opening and the head inset hole. Thus, the up an down stroke of motion of the upper and lower heads on the drive apparatus side can be as small as possible to make the drive apparatus slim. Moreover, the head positioning accuracy can be increased.

Further, according to the first aspect, since the head accommodating portion is formed on a portion in the upper half corresponding to the head insert hole in the lower half, strength with respect to outer stress from a plane direction can be increased, compared with a disk cartridge with head insert holes on both sides thereof. As a result sufficient strength with respect to an outer force by a twist can be also obtained. Therefore, the case does not break down by rough handling, avoiding damage on the recording medium.

Still further, according to the first aspect, the disk cartridge can be obtained which can keep sufficient strength if the head insert hole is formed on the lower half (one side), and can prevent reverse insertion to the drive apparatus in advance.

Preferably, in the space formed between the upper half and lower half, an elastic member is accommodated in the vicinity of the lower head insert hole. The elastic member biases a shutter in a closed position when the case is not installed in the drive apparatus. Thus, since the shutter is always closed when not in use entry of dust and foreign substances into the shutter can be prevented.

The above upper head accommodating portion is preferably formed to have a trapezoidal shape when the case is seen from a prescribed edge surface. Thus, the strength of the case can be further increased. That is, when a bending force is exerted on the case, the force disperses on an inclined portion of the trapezoid so that the case is strong with respect to bending. Further, since the short side portion of the shutter slides along an inclined side of the upper head accommodating portion formed in the trapezoidal shape, it is possible to prevent snagging and to perform a stable shutter opening/closing operation.

Further, in a preferred embodiment, a pair of linear protruding portions is formed on the outer surface of the upper half, extending along a pair of edge surfaces perpendicular to the prescribed edge surface. These linear protruding portions are provided to further increase the strength of the case. The height of the highest surface portion of the pair of the linear protruding portions is preferably selected to be approximately the same as the height of the highest surface portion of the upper head accommodating portion. Thus, the heights of the highest surface portions of the linear protruding portions and the upper head accommodating portion are aligned and stacked disk cartridges do not rattle. As a result, the disk cartridge is highly suitable for storage and transportation.

In another preferred embodiment, the end portion of the short side portion of the shutter extends to a position in the vicinity of the highest surface portion of the upper head accommodating portion. When the shutter is opened, the end portion protrudes through a surface of another portion of the main surface of the upper half lower than the upper head accommodating portion. By using the protruding portion, on the drive apparatus side, detection of opening of the shutter can be performed, for example. The resulting detection can be applied to a certain control (for example, control for permitting loading of the disk cartridge only when the shutter is opened).

The disk cartridge of the present invention is provided with the upper head accommodating portion having an enlarged portion on one surface of the case. Therefore, the shutter cannot slide on one surface and slides only on the other surface. Therefore, in the structure as it is, the shutter is not held well with respect to the case. In the preferred embodiment, a thin portion is formed in the vicinity of the end portion of the long side portion of the shutter, and an engaging hole is formed on the lower half. The thin portion of the long side portion is inserted in the engaging hole to engagingly hold the shutter. Thus, the shutter becomes extremely well held with respect to the case.

Further, in another preferred embodiment, a position of one end (an end in a reverse direction to the opening direction) of a first portion of the long side portion opposed to the lower head insert hole and a position of one end (an end in a reverse direction to the opening direction) of a short side portion opposed to the edge surface opening are shifted in the opening direction side from a position of one end (an end in a reverse direction to the opening direction) of a second portion of the long side portion opposed to a spindle hole. Thus, when the shutter is opened, the lower head insert hole is exposed earlier than the spindle hole. As a result, when the disk cartridge is inserted in the drive apparatus, the edge surface opening and the lower head insert hole are rapidly opened to prevent the upper and lower heads on the drive apparatus side from interfering in the shutter, causing it to break down. Moreover, by rapidly opening the edge surface opening and the lower head insert hole, it is possible to insert the upper and lower heads on the drive apparatus side before the disk cartridge is completely installed in the drive apparatus and to shorten the depth of the drive apparatus.

In an inner surface of the upper half, a rib may be formed along a circumferential direction on a sightly center side from a circumference of the disk-like recording medium. Thus, it is possible to prevent deviation inside the case of the disk-like recording medium in the vertical direction.

Further, in an outer surface of the upper half, an enlarged portion having the same width and height as that of the upper head accommodating portion may be formed in the vicinity of an end on a reverse direction side to the inserting direction to the drive apparatus. Thus, the strength of the case can be further increased.

Further, in the outer surface of the upper half, a convex wall may be formed at the end on the reverse direction side to the inserting direction to the drive apparatus, extending from the enlarged portion to the pair of, right and left, linear protruding portions. Thus, a shape of a front surface of the case (a shape seen from a reverse surface to a surface which is first inserted to the drive apparatus) becomes rectangular. Therefore, if a cartridge insert hole in a rectangular shape corresponding to the shape of the front surface of the case is provided for the drive apparatus, the cartridge insert hole is completely closed by the case when the disk cartridge is completely inserted in the drive apparatus, and it is possible to prevent the entry of dust and foreign substances into the drive apparatus in use. Further, the convex wall further increases the strength of the case, and acts as a spacer when an extreme force is exerted on the case in the vertical direction to inhibit the disk-like recording medium from being damaged. Further, it is possible to decrease occurrence of warpage when the case is molded.

A second aspect of the present invention is directed to a disk cartridge for use in a drive apparatus having an upper head and an opposed lower head, and which is formed so as to read recorded information from a disk-like recording medium inserted between the upper head and the lower head. The disk cartridge has a flat rectangular shape, with the disk-like recording medium rotatably held in a space, and comprises:

a case formed by opposing an inner side of the upper half to an inner side of the lower half and defining an outer shape of the disk cartridge;

a lower head insert hole formed in the lower half so as to extend from an approximate center of a prescribed edge surface to a center direction of the disk cartridge;

an upper head accommodating portion formed in the upper half on an upper portion directly overlying the lower head insert hole. The upper head accommodating portion has an enlarged shape compared with other portions of a main surface of the upper half, and forms on the prescribed edge surface an edge surface opening which connects with the lower head insert hole and in which the upper head can be inserted.

A shutter is formed in an approximately L-shaped cross-section having a short side portion and a long side portion perpendicular to each other. The shutter is operable to close the edge surface opening on the short side portion, to close the lower head insert hole on the long side portion, and to slidably open when the case is inserted in the drive apparatus in a state of being interposed between the upper half and the lower half.

A elastic member is accommodated in a vicinity of the lower head insert hole in a space formed between the upper half and the lower half, and biases the shutter in a closed position when the case is not installed in the drive apparatus.

The above second aspect has the same effect as that of the above first aspect.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
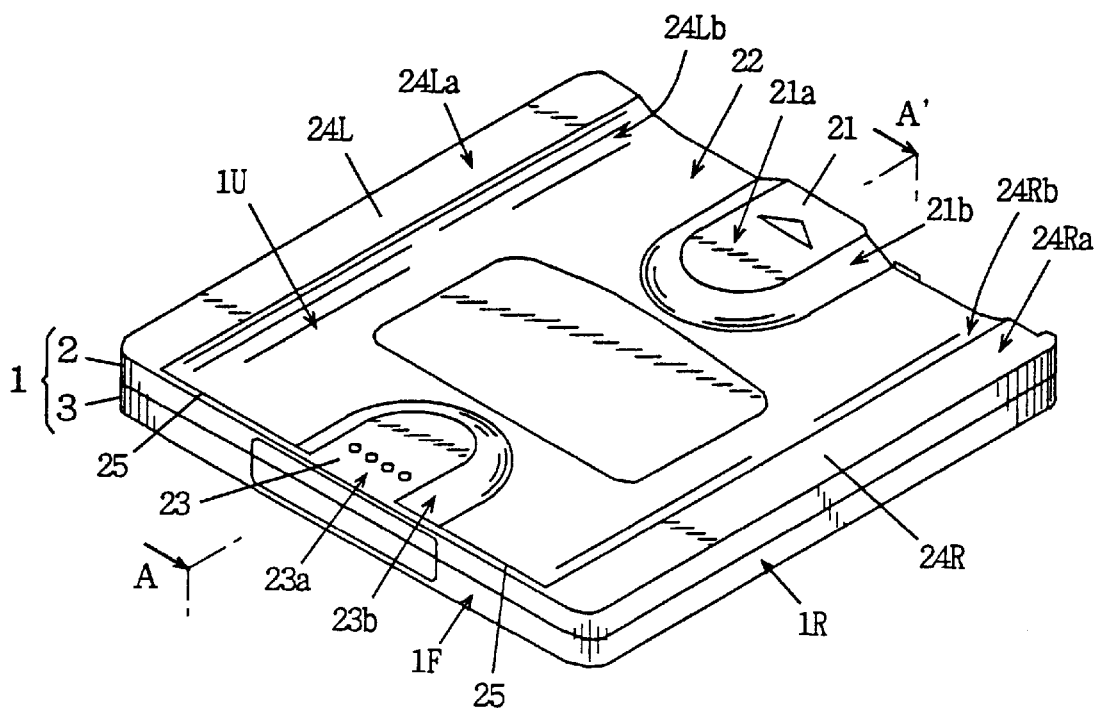
FIG. 1 is an upper perspective view of a disk cartridge according to a first embodiment of the present invention.
Figure 2:
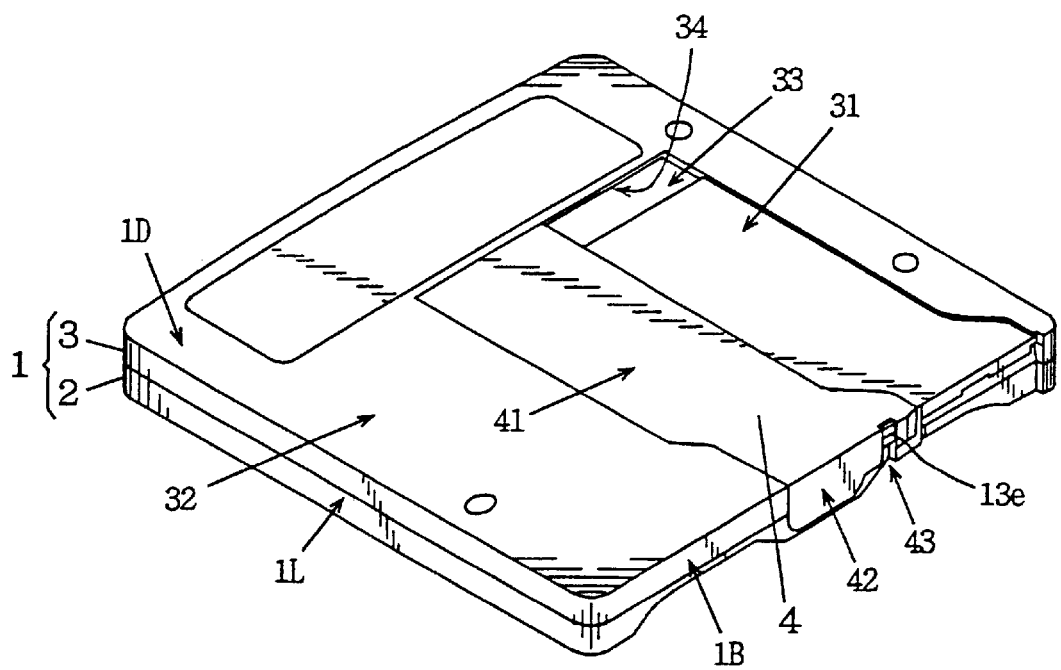
FIG. 2 is a lower perspective view of the disk cartridge according to the first embodiment.
Figure 3:
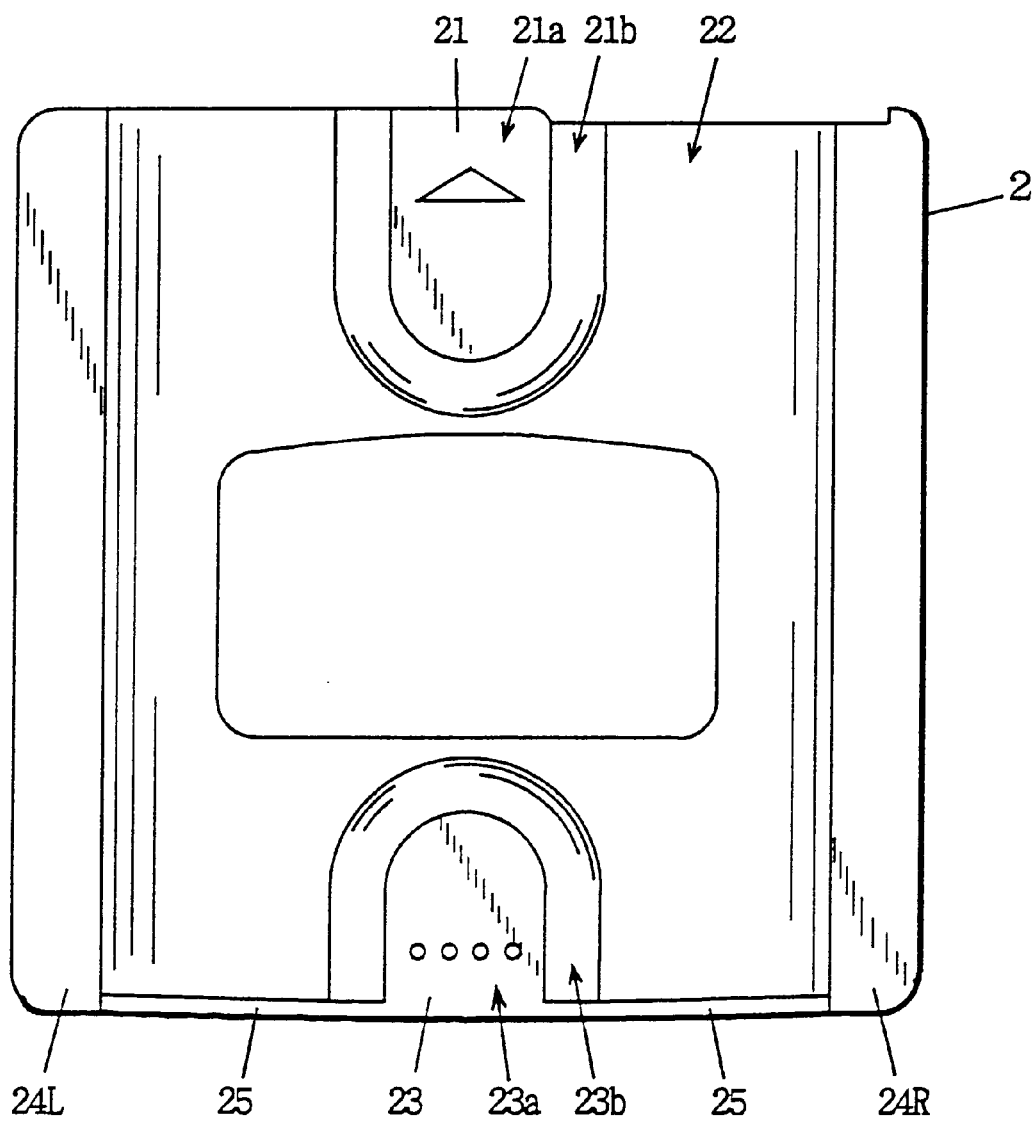
FIG. 3 is a top plan view of the disk cartridge according to the first embodiment.
Figure 4:
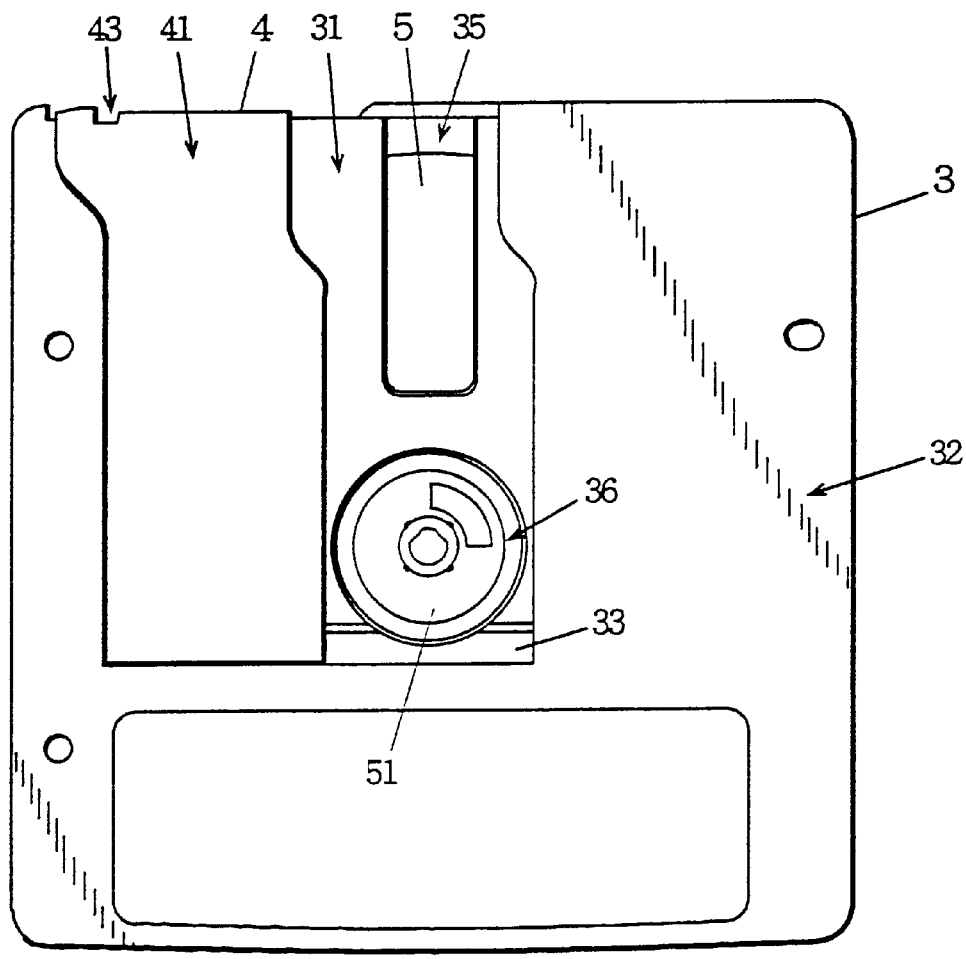
FIG. 4 is a bottom plan view of the first embodiment.
Figure 5:
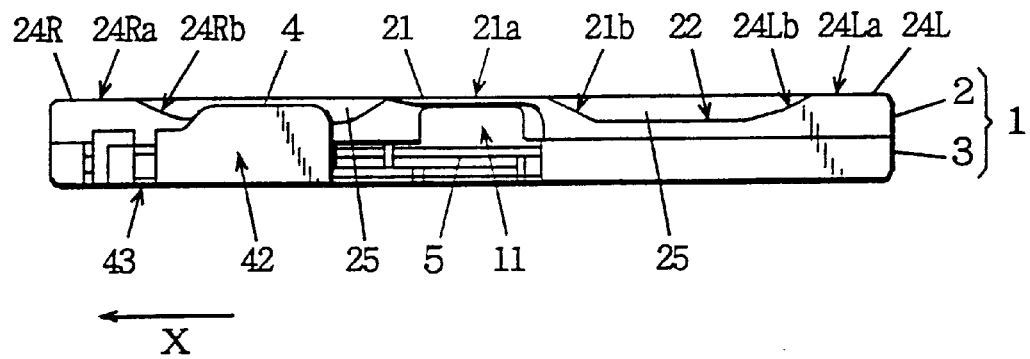
FIG. 5 is a rear elevational view of the disk cartridge according to the first embodiment.

FIG. 1 is an upper perspective view of a disk cartridge according to a first embodiment of the present invention. FIG. 2 is a lower perspective view of the disk cartridge according to the first embodiment. FIG. 3 is a top plan view of the disk cartridge according to the first embodiment. FIG. 4 is a bottom plan view of the first embodiment. FIG. 5 is a rear elevational view of the disk cartridge according to the first embodiment. The characteristics of the disk cartridge according to the first embodiment of the present invention are subsequently described according to FIGS. 1 to 5.

A plane of a case 1 is formed in a rectangular shape. Such case 1 is configured by opposing an inner surface of an upper half 2 to an inner surface of a lower half 3 which are molded in a synthetic resin and connected by ultrasonic deposition, screws, etc. A space is formed inside the case 1, and a disk-like recording medium 5 (refer to FIG. 4) such as a magnetic disk, a CD-ROM, an MOD (magnetic optical disk) is rotatably accommodated in the space. Therefore, the case 1 has a flat rectangular parallelepiped shape as shown in FIGS. 1 and 2, and its outer shape is defined by an upper surface 1U, a lower surface 1D, a front surface 1F, a back surface 1B, a right side surface 1R and a left side surface 1L.

A lower head insert hole 35 is formed on the lower surface 1D from an approximately center portion of the rear surface 1B to the center of the case. An upper head accommodating portion 21 is protrudingly formed in the upper surface 1U approximately directly over the lower head insert hole 35. The upper head accommodating portion 21 has on the rear surface 1B an edge surface opening 11 which connects with the lower head insert hole 35 and into which the upper head can be inserted. The lower head insert hole 35 and the edge surface opening 11 are closed by a shutter 4 with an L-shaped cross-section having a short side portion and a long side portion perpendicular to each other. The case 1 is inserted into a drive apparatus described later from the rear surface 1B side. The drive apparatus has an upper head and a lower head opposedly arranged, and reads recorded information from the disk-like recording medium by inserting the disk-like recording medium between the upper head and the lower head. When the disk-like recording medium is writable such as an MOD, the upper head and the lower head not only can read the recorded information but also can write information.

The shutter 4 is slidably held in the case 1. The shutter 4 has the long side portion 41 partially covering an outer surface of the lower half 3 and the short side portion 42 partially covering a rear surface of the case 1, with the long side portion 41 and the short side portion 42 being perpendicular to each other. Therefore, the cross section of the shutter 4 is formed in an L-shape. The shutter 4 is elastically biased in the closing direction by a spring (described later) accommodated inside the case 1, and in a normal storage condition, the shutter 4 is closed. FIG. 2 shows a closed state of the shutter 4. In the closed state, the shutter 4 is locked by a shutter lock member (described later) accommodated in the case 1. Therefore, the shutter 4 does not easily open to prevent the disk-like recording medium 5 in the case from being inadvertently exposed. FIGS. 4 and 5 show open states of the shutter 4. A locked state of the shutter 4 by the shutter lock member is released by the drive apparatus described later, and in response to the release of the locked state, the shutter 4 is opened. That is, when the disk cartridge of the present embodiment is inserted in the drive apparatus, the lock of the shutter 4 is released by the structure on the drive apparatus side. The lock and locking mechanism of the shutter 4 are subsequently described in detail.

Next, the structure of the upper half 2 is described. An upper head accommodating portion 21 is formed in the vicinity of the rear surface 1B of the case 1 and at the center portion in the lateral direction of the upper half 2. The upper head accommodating portion 21 is formed larger than other parts of the upper surface 1U of the case 1. That is, the upper head accommodating portion 21 includes an inclined portion 21b which rises at a prescribed angle from a lowest surface portion 22 of the upper surface 1U of the case 1, and a highest surface portion 21a. Therefore, as shown in FIG. 5, the upper head accommodating portion 21 is formed in a trapezoidal shape when seen from the rear surface 1B side of the case 1. The upper head accommodating portion 21 is provided to form the edge surface opening 11 for inserting the upper head of the drive apparatus (refer to FIG. 5). The upper head of the drive apparatus is inserted in the upper head accommodating portion 21 in a horizontal direction from the front of the edge surface opening 11. Therefore, if a beinging force is exerted on the case 1, the force disperses on an inclined portion of the trapezoid, resulting in increasing the resistance to bending. Furthermore, the short side portion of the shutter 4 slides along an inclined side of the upper head accommodating portion 21 formed in a trapezoidal shape, to prevent snagging and enabling the shutter to perform a stable opening/closing operation.

Furthermore, an enlarged portion 23 is formed in the vicinity of the front surface 1F of the case 1 and at the center portion in the lateral direction of the upper half 2. The enlarged portion 23, like the upper head accommodating portion 21, includes an inclined portion 23b which rises at a prescribed angle from a lowest surface portion 22 of the upper surface 1U of the case 1, and a highest surface portion 23a having a flat surface. The height of the highest surface portion 23a of the enlarged portion 23 is selected to be almost the same as the height of the highest surface portion 21a of the upper head accommodating portion 21. Thus, the strength of the case 1 can be further increased.

A right linear protruding portion 24R and a left linear protruding portion 24L are formed in a right end portion and a left end portion of the upper half 2, extending along the right side surface 1R and the left side surface 1L, respectively. The right linear protruding portion 24R and the left linear protruding portion 24L respectively include inclined portions 24Rb and 24Lb which rise at a prescribed angle from the lowest surface portion 22 of the upper surface 1U of the case 1, and highest surface portions 24Ra and 24La each having a flat surface. The heights of the highest surface portions 24Ra and 24La are selected to be almost the same as the height of the highest surface portion 21a of the upper head accommodating portion 21. Furthermore, a pair of, right and left, convex walls 25 extending to the right and left linear protruding portions 24R and 24L from the enlarged portion 23 is formed on the front surface 1F of the case 1. This can further increase the strength of the case 1, and acts as a spacer when a extreme force in a vertical direction is exerted on the cartridge, preventing damage to the disk 5. Moreover, the occurrence of warpage when the case 1 is molded can be decreased. Furthermore, by forming a pair of, right and left, convex walls 25, a shape of the front surface 1F of the case 1 becomes rectangular, and when a shape of the cartridge insert hole of the drive apparatus is made to correspond to a shape of the rear surface 1B of the case 1, if the disk cartridge is completely installed in the drive apparatus, the cartridge insert hole is completely closed, and the entry of dirt and dust during the drive apparatus in use can be prevented.

As described above, the upper surface 1U of the case 1 is not provided with a head insert hole such as provided for the conventional disk cartridge. Therefore, the case 1 is stronger than the convention al disk cartridge case. Furthermore, the inclined portions 21b, 23b, 24Rb and 24Lb are provided to extremely increase the strength of the upper housing with respect to a bending direction, compared with a disk cartridge having a flat surface. This is because the inclined portions 21b, 23b, 24Rb and 24Lb disperse the bending force in a normal direction. Moreover, since the highest surface portions 21a, 23a, 24Ra, and 24La are aligned in the same height, when a plurality of disk cartridges is stacked for storage, the disk cartridges do not rattle. Furthermore, since the concave portion surrounded by the convex portions (the lowest surface portion 22) is not rubbed at the time of stacking, the concave portion can be used as an area to which a label showing a content of the disk is affixed.

Next, the structure of the lower half 3 is described. The lower half 3 is formed so that its surface has a almost flat shape. A slide area 31 in which the shutter 4 slides, however, is lower in height for the thickness of the long side portion 41 of the shutter 4 than a main surface area 32 of the lower half 3. Thus, the surface of the long side portion 41 of the shutter 4 does not protrude from the main surface area 32 of the lower half 3. This means that when a plurality of disk cartridges are stacked for storage, the disk cartridges do not rattle. Furthermore, in the slide area 31, a step portion 33 is formed at an end portion in a side closer to the front surface 1F of the case 1. The step portion 33 is slightly lower than the slide area 31. In the step portion 33, a slit-shaped engaging slot 34 is formed between the side closer to the front surface 1F of the case 1 and the main surface area 32. In the engaging slot 34, an end portion of the long side portion 41 of the shutter 4 is inserted to be engaged.

The shutter of the conventional disk cartridge is formed having a channel cross-section so as to contact both of the upper and lower surfaces of the case. Therefore, when the shutter is held at one point, the shutter does not easily come off the case. On the other hand, in the disk cartridge of the present embodiment, the upper head accommodating portion 21 having an enlarged shape is formed on the upper surface 1U of the case 1, instead of the head insert hole. Consequently, the shutter 4 cannot slide on the upper surface 1U of the case 1. Therefore, the shutter 4 is formed with an L-shaped cross-section, contacting only with the lower surface 1D of the case 1. In this structure, when the shutter 4 is held at only one point, the shutter 4 is not held well with respect to the case 1 and easily comes off from the case 1. Therefore, in the above embodiment, not only by holding the short side portion 42 of the shutter 4 between the upper half 2 and the lower half 3, but also by inserting the end portion of the long side portion 41 of the shutter 4 in the engaging slot 34 for engagingly holding, the holding ability of the shutter 4 with respect to the case 1 is increased.

Furthermore, as shown in FIG. 4, the lower head insert hole 35 and a spindle hole 36 are formed in the lower half 3. The lower head insert hole 35 is arranged in the vicinity of the rear surface 1B of the case 1 and at the center portion in the lateral direction of the lower half 3. The lower head of the drive apparatus is inserted in the lower direction of the lower head insert hole 35. The spindle hole 36 is arranged in an approximately center portion of the lower half 3 and in a position opposed to a hub 51 provided in the center of the disk-like recording medium 5. The diameter of the spindle hole 36 is selected to be larger than the diameter of the hub 51. Therefore, When the shutter 4 opens, the hub 51 is completely exposed through the spindle hole 36. The hub 51 is chucked by a spindle of the drive apparatus and then is rotated.

Figure 6:
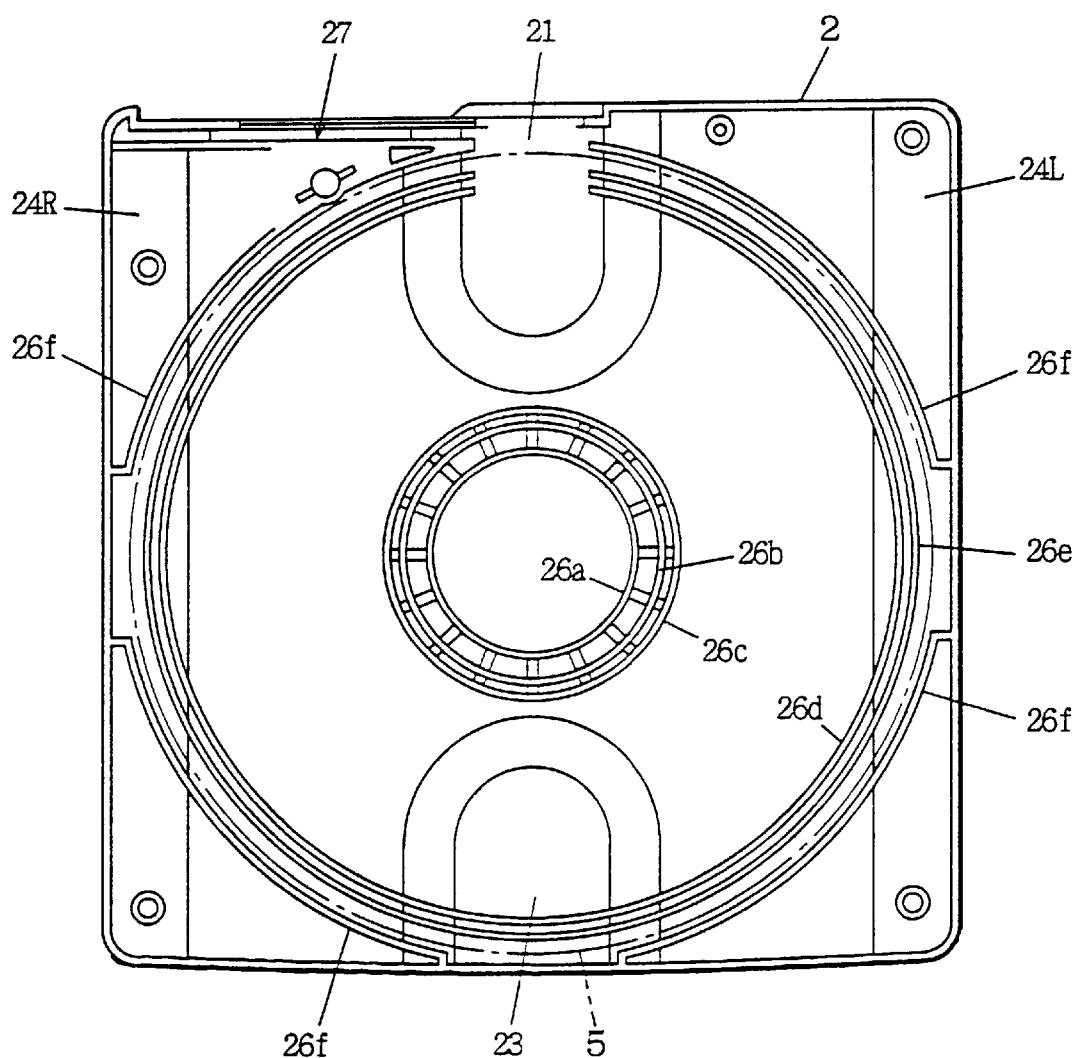
FIG. 6 is a diagram showing the inside of the upper half 2 in detail.
Figure 7:
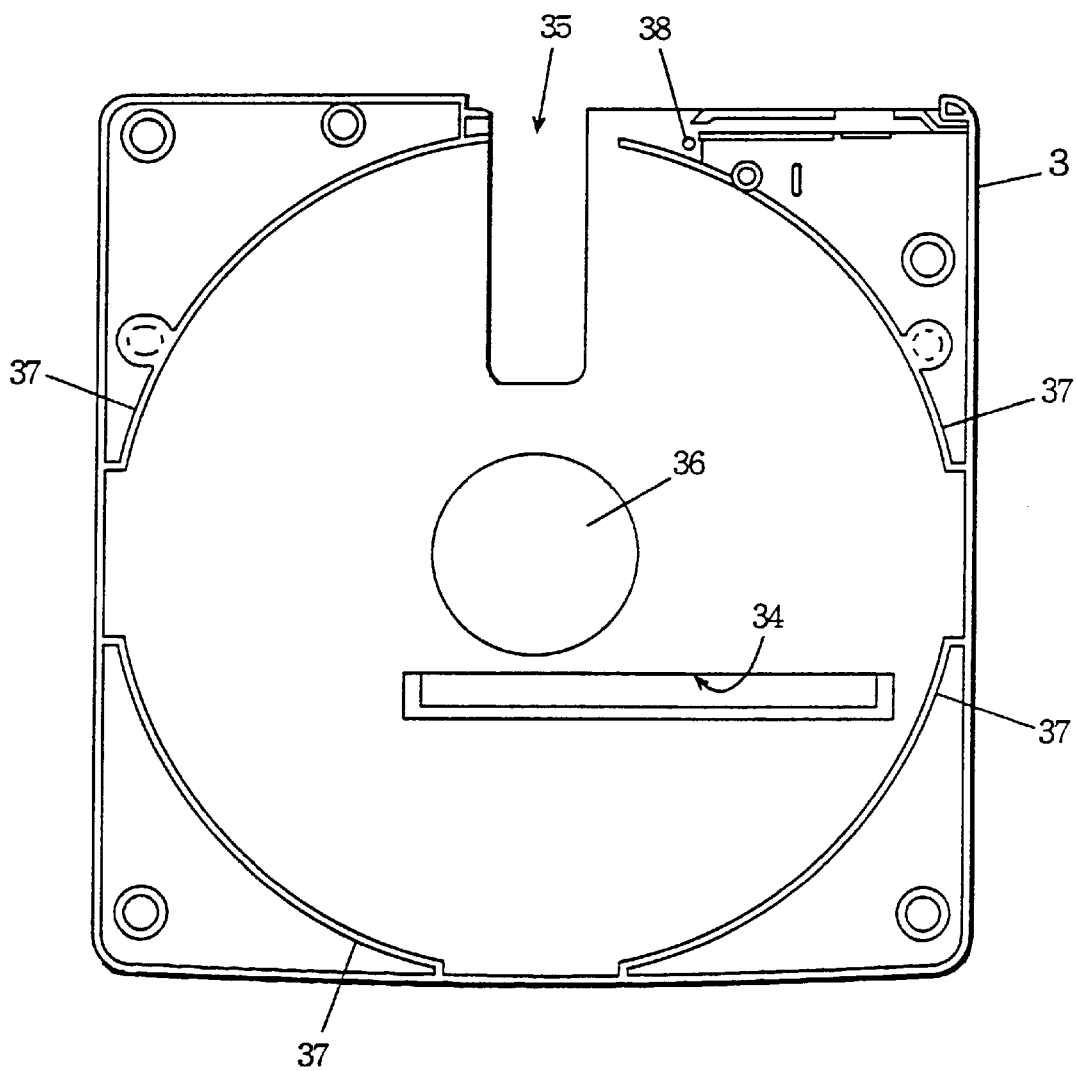
FIG. 7 is a diagram showing the inside of the lower half 3 in detail.

FIG. 6 is a diagram showing the inside of the upper half 2 in detail. FIG. 7 is a diagram shown the inside of the lower half 3 in detail. The inside structure of the case 1 is subsequently described referring to FIGS. 6 and 7.

As in FIG. 6, a plurality of ribs 26a to 26f which extend along the circumferential direction of concentric circles whose diameters are different are formed inside the upper half 2. On the other hand, a rib 37 which extends along the circumferential direction of a circle having the same center as the spindle hole 36 is formed inside the lower half 3. The diameter of the rib 26a is selected to be approximately the same as the diameter of the spindle hole 36 formed in the lower half 3. The rib 26a (shown in FIG. 14) is provided opposite to a flange 52 of the hub 51. When an extreme force is exerted across the thickness of the case 1, the flange 52 of the hub 51 is interposed between the rib 26a and a peripheral portion 36 of the spindle hole 32 inside the lower half 3. As a result, a space between the upper half 2 and the lower half 3 opposed to the disk-like recording medium 5 is secured to prevent damage of the disk. The ribs 26b and 26c regulate displacement in the vertical direction of the disk-like recording medium 5 on the periphery of the hub 51. Similarly, the ribs 26d and 26e regulate displacement in the vertical direction of the vicinity of the circumference of the disk-like recording medium 5. The disk-like recording medium thus stably rotates in approximately the same plane. The diameter of the rib 26f is selected to be approximately the same as the diameter of the rib 37. When the upper half 2 and the lower half 3 are opposed, the rib 26f is opposed to the rib 37, thereby separating a rotating area of the disk-like recording medium 5 from its outer area and preventing the entry of dust. Furthermore, in the present embodiment, since the ribs 26d and 26e regulate the rotating surface of the disk 5 to the lower half 3 side from the center of the thickness of the case 1, a distance from the lower surface ID to the disk 5 can be shortened, and the moving stroke at the time of loading of the heads and the spindle can be small, resulting in downsizing the drive apparatus.

Figure 8:
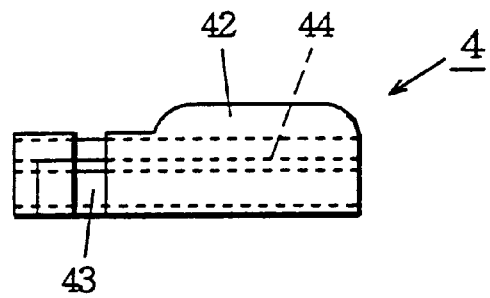
FIG. 8 is a front elevational view of the shutter 4.
Figure 9:
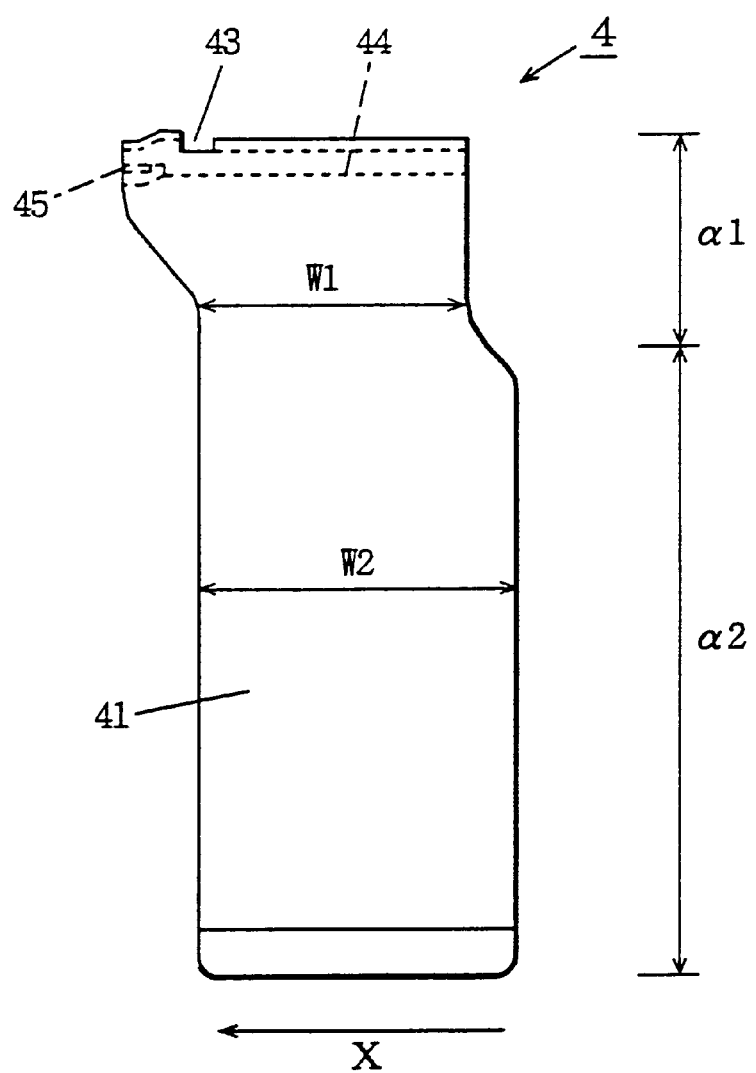
FIG. 9 is a top plan view of the shutter 4.
Figure 10:
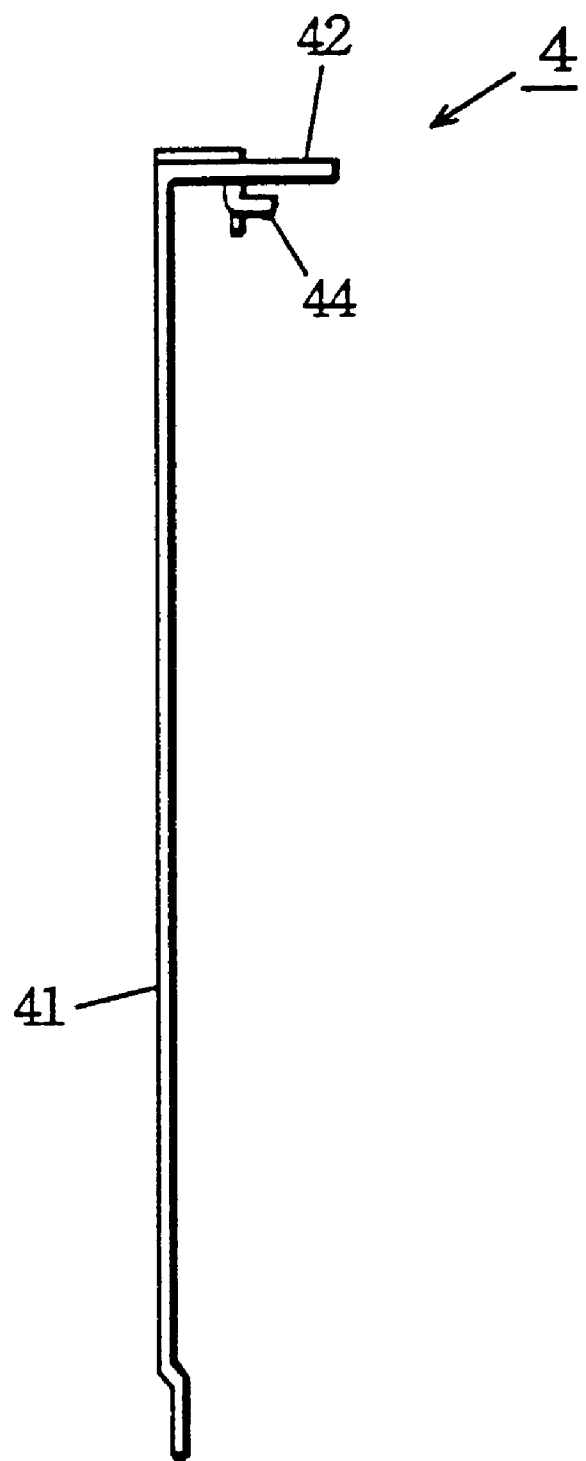
FIG. 10 is a side view of the shutter 4.
Figure 11:
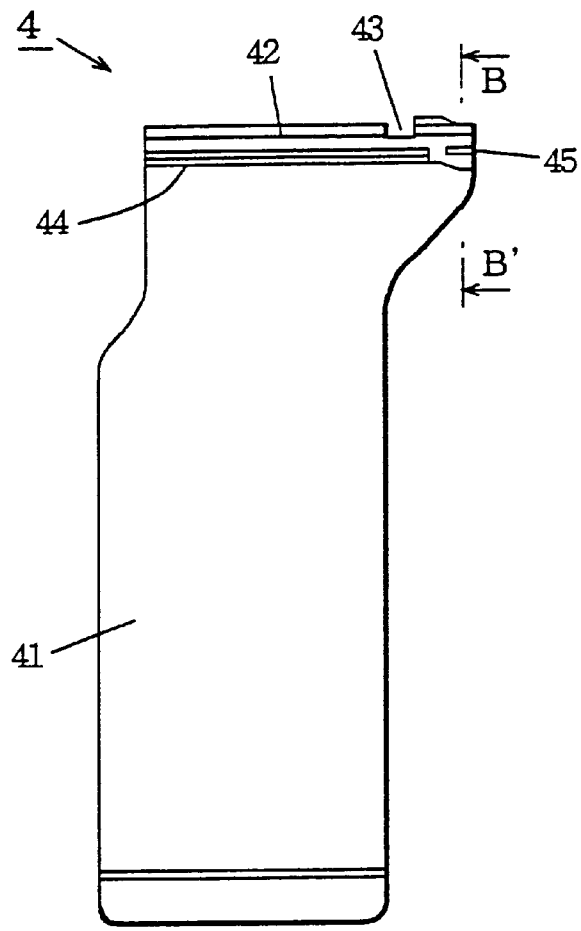
FIG. 11 is a bottom plan view of the shutter 4.
Figure 12:
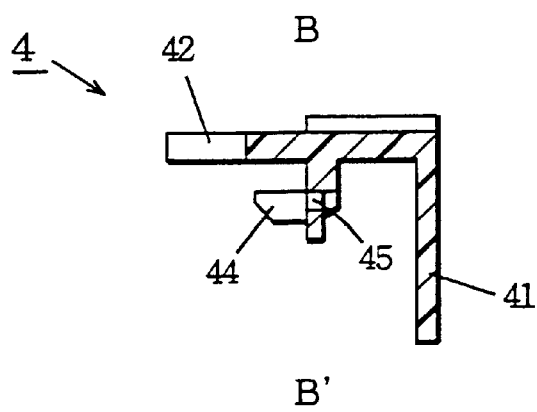
FIG. 12 is an enlarged cross-sectional view along a line B–B' in FIG. 11.
Figure 13:
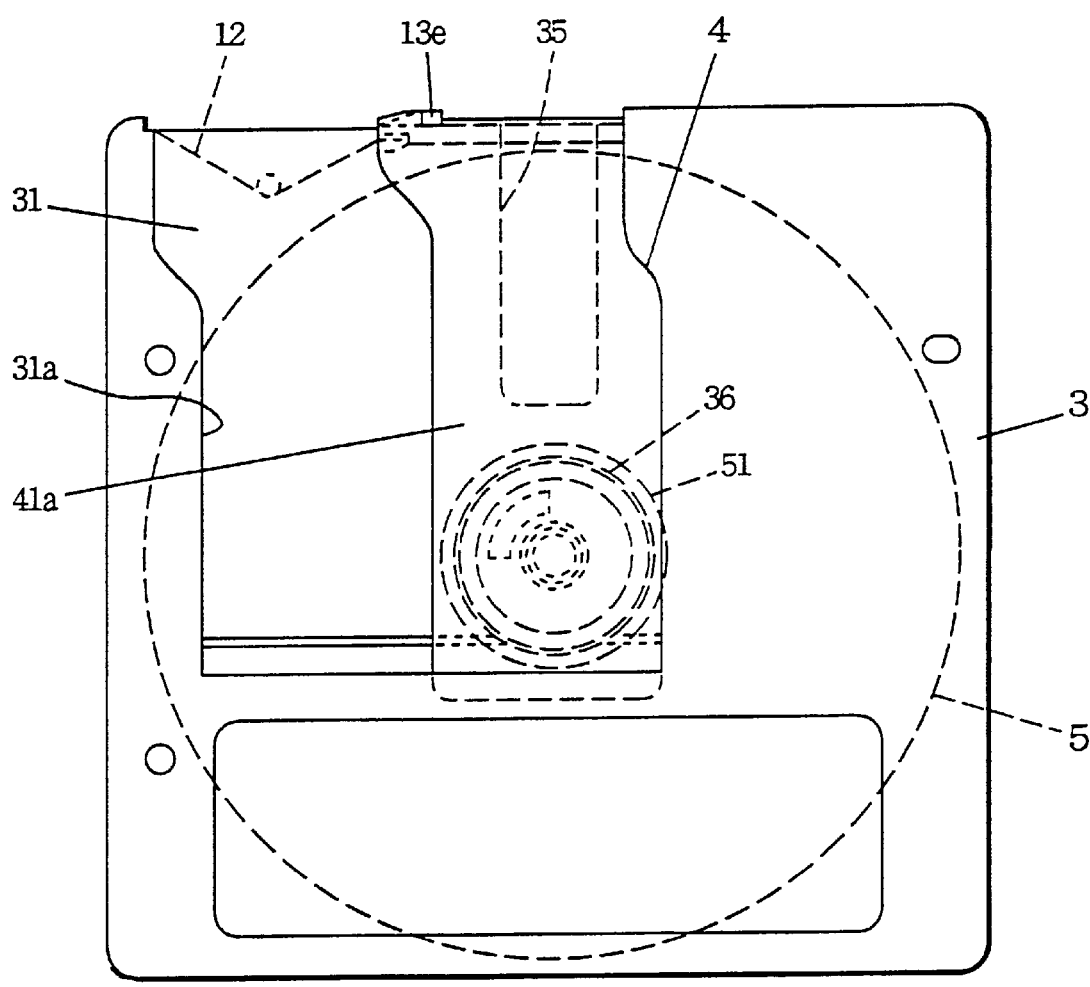
FIG. 13 is a bottom plan view of the disk cartridge of the present embodiment with the shutter 4 closed.
Figure 14:
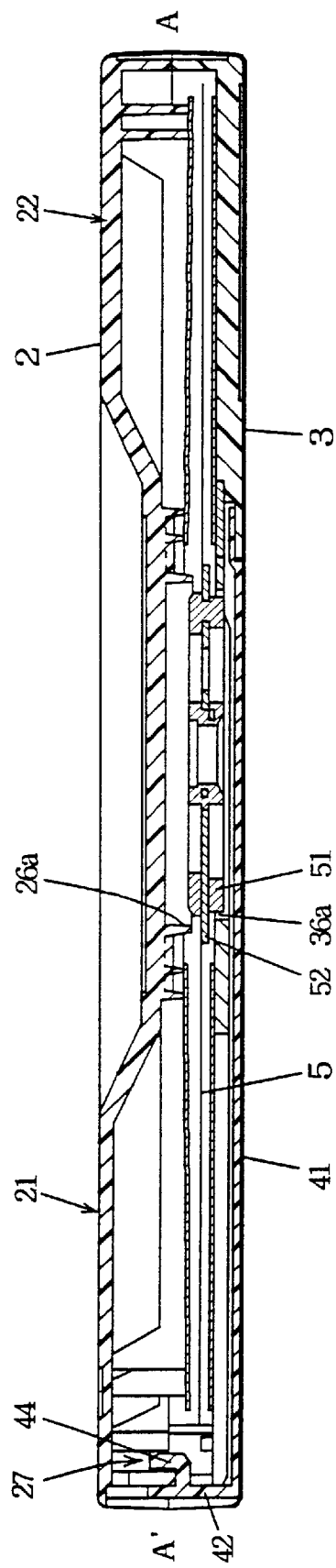
FIG. 14 is a cross-sectional view along a line A–A' in FIG. 1.

FIG. 8 is a front elevational view of the shutter 4. FIG. 9 is a top plan view of the shutter 4. FIG. 10 is a side view of the shutter 4. FIG. 11 is a bottom plan view of the shutter 4. FIG. 12 is an enlarged cross-sectional view along a line B–B' in FIG. 11. FIG. 13 is a bottom plan view of the disk cartridge of the present embodiment. FIG. 14 is a cross-sectional view along a line A–A' in FIG. 1. The shape of the shutter 4 is subsequently described referring to FIGS. 8 to 14.

The shutter 4 is formed by being molded in a synthetic resin, and comprises one flat long side portion 41 and the short side portion 42 mounted from a front end of the long side portion 41. Therefore, a side shape of the shutter 4 is an approximately L, as shown in FIG. 10.

As shown in FIGS. 2 and 4, the long side portion 41 of the shutter 4 is arranged in the slide area 31 of the lower half portion 3, and has a function of closing the lower head insert hole 35 and the spindle hole 36 when closed. On the other hand, the short side portion 42 of the shutter 4 has a function of opening and closing the edge surface opening 11, as shown in FIGS. 2 and 5. In the short side portion 42, an engaging window 43 is formed penetrating the short side portion 42 from the front side to the rear side in the downstream of the shutter opening direction (in an arrow X direction in FIG. 5).

A nail-like portion 44 whose side shape is a small L is formed approximately throughout the length inside the short side portion 42 (refer to FIG. 10). As shown in FIG. 14, the nail like portion 44 is inserted in the slide slot 27 formed inside the upper half 2 and acts as a guide and a slip stopper of the shutter 4.

A spring end receive slot 45 is formed in an end portion of the downstream of the shutter opening direction X in the nail-like portion 44. As shown in FIG. 13, in the case 1, a spring 12 is tensionally hung between the inner surface of the lower half 3 and the spring end receive slot 45. The spring 12 elastically biases the shutter 4 in the closing direction, and when the disk cartridge is not used, the edge surface opening 11, the lower head insert hole 35 and the spindle hole 36 are always closed.

Figure 15:
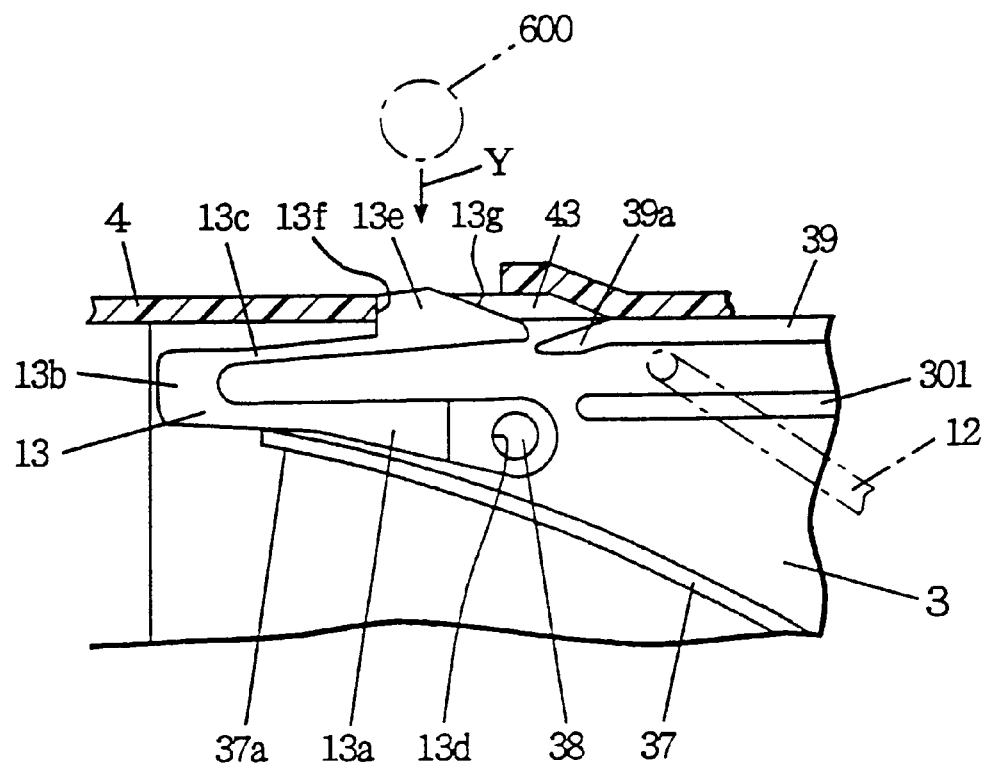
FIG. 15 is a partially enlarged view showing locking the shutter 4.
Figure 16:
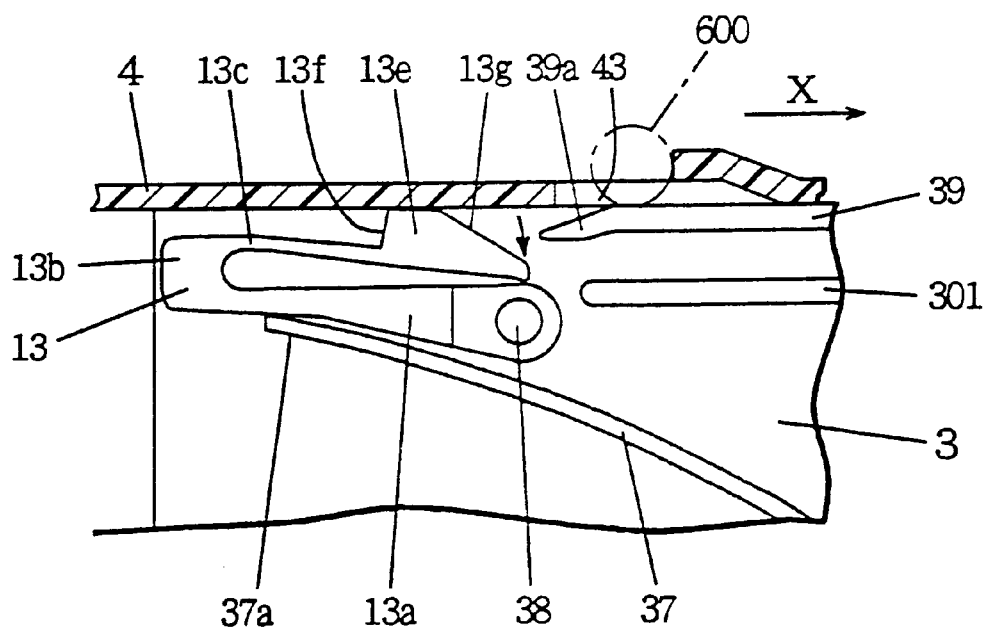
FIG. 16 is a partially enlarged view showing the course of opening the shutter 4.

FIG. 15 is a partially enlarged view showing a state of locking the shutter 4. FIG. 16 is a partially enlarged view showing a state in the course of opening the shutter 4. The opening and closing function of the shutter 4 are subsequently described referring to FIGS. 15 and 16.

A locking member 13 is formed by a molded elastic synthetic resin, and has a function of holding the shutter 4 at a prescribed close position to prevent the shutter 4 from moving. As shown in FIG. 15, the locking member 13 has a U-shape plane, and comprises a base portion 13a, a folded portion 13b and a thin bent portion 13c extending parallel to the base portion 13a.

In the vicinity of the end of the base portion 13a, a hole 13d is formed, and a shaft 38 protruding from the lower half 3 is inserted through the hole 13d. Thus, the locking member 13 is rotatably held with a prescribed angle with respect to the lower half 3. An engaging nail 13e is formed at the end portion of the bent portion 13c. An engaging surface 13f and an inclined surface 13g are formed on one side (the upstream of the shutter opening direction X) and the other side (the downstream of the shutter opening direction X) of the engaging nail 13e, respectively.

As to a side wall 39 of the lower half 3 positioned at the downstream of the shutter opening direction X seen from the locking member 13, an end portion opposed to the locking member 13 is inclined to the center side of the lower half 3 to form a rib-like regulating portion 39a. A spring slide protrusion 301 extending parallel to the side wall 39 is provided on the preceding side thereof, and on one end of the spring 12 is positioned on the spring slide protrusion 301. When the shutter 4 is closed, the engaging nail 13e of the locking member 13 fits in the engaging window 43 of the shutter 4 to hold the shutter 4 at the locked position, thereby preventing the shutter 4 from inadvertently moving.

When the disk cartridge is inserted in the drive apparatus described later, a shutter opening/closing pin 600 in the drive apparatus abuts on the engaging nail 13e exposed from the engaging window 43, and when the disk cartridge is further inserted in the drive apparatus, the shutter opening/closing pin 600 gets into the engaging window 43.

As shown in FIG. 15, the locking member 13 is held by the shaft 38 as well as an end 37a of the rib 37. Therefore, when a force is exerted in a lock releasing direction Y (refer to FIG. 15) of the locking member 13 by being pressed by the shutter opening/closing pin 600, the bent portion 13c of the locking member 13 is bent at the end 37a of the rib 37 as a fulcrum to a side of the shaft 38, as shown in FIG. 16. The bending releases the engaging nail 13e from the engaging window 43 to release the lock of the shutter 4, and the end of the engaging nail 13e displaces through the vicinity of the regulating portion 39a to the side of the shaft 38. Thus, when a force is normally exerted on the locking member 13 in the lock releasing direction Y, the regulating portion 39a is in a position keeping out of the way.

When the disk cartridge is further inserted in the drive apparatus, the shutter opening/closing pin 600 moves along the shutter opening direction X with respect to the disk cartridge. As the shutter opening/closing pin 600 moves, the shutter 4 slides along the shutter opening direction X (refer to FIG. 16).

From a close state in FIG. 13, the shutter 4 opens; one of side end edges 41a of the long side portion 41 abuts on one side end edge 31a of the slide area 31 to end the opening operation of the shutter 4; the edge surface opening 11, the lower head insert hole 35 and the spindle hole 36 are completely opened; and recording/reproducing of desired data is performed on the disk-like recording medium 5.

Figure 17:
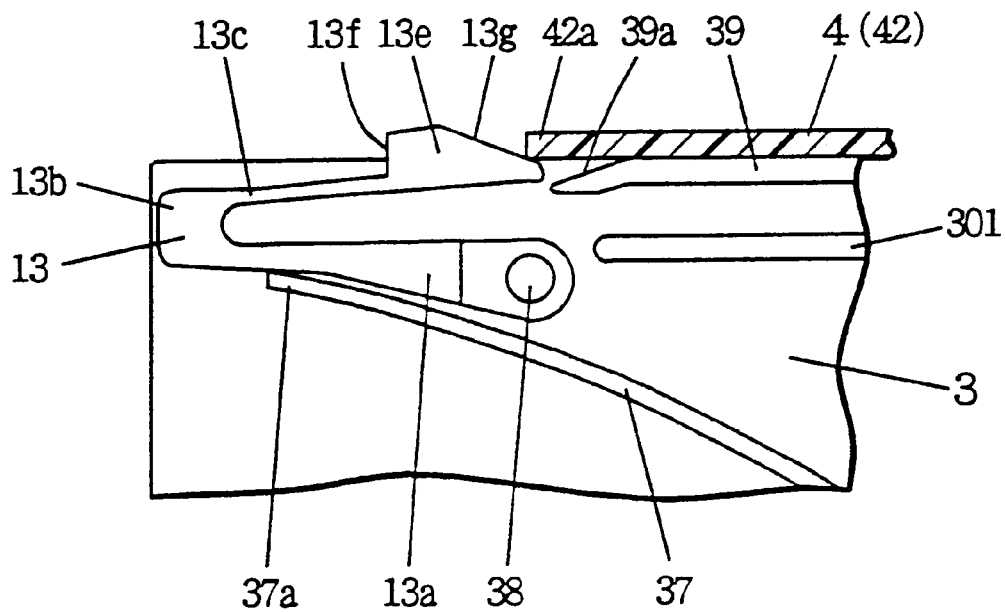
FIG. 17 is a diagram showing the shutter 4 in a complete open position.

FIG. 17 shows a state that the shutter 4 is in a complete open position, and one of the side end edges 42a (the upstream of the shutter opening direction X) of the short side portion 42 of the shutter 4 is on an inclined surface 13g of the engaging nail 13e. Therefore, when the disk cartridge is ejected from the drive apparatus, the engaging nail 13e is automatically pressed by a returning operation of the shutter 4 by the elasticity of the spring 12, whereby a smooth returning operation of the shutter 4 can be performed.

Figure 18:
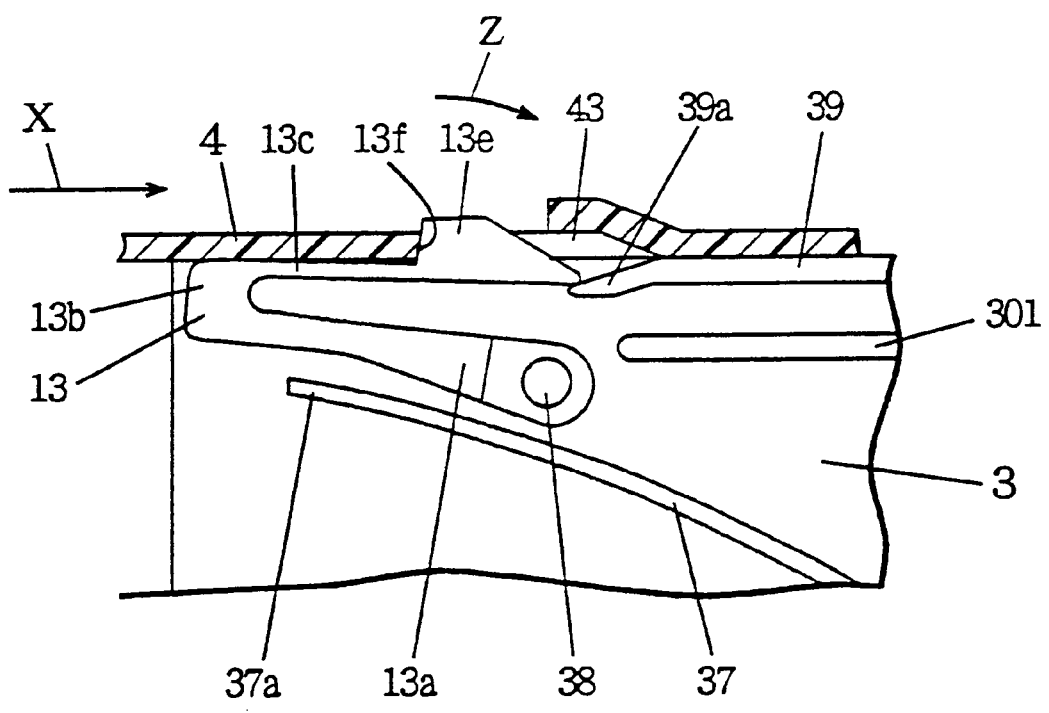
FIG. 18 is a diagram showing the shutter 4 deliberately opened without inserting the disk cartridge in the drive apparatus.

FIG. 18 is a diagram showing a state that a force is exerted in the opening direction X (sliding direction) of the shutter 4 without acting in the lock releasing direction of the locking member 13 such as in a case that the shutter 4 is deliberately opened without inserting the disk cartridge in the drive apparatus.

As shown in FIG. 18, a force in the arrow X direction is acted on the shutter 4, one of the side end edges of the engaging window 43 of the shutter 4 abuts on the engaging surface 13f of the engaging nail 13e. Therefore, the locking member 13 rotates with the prescribed angle in a clockwise direction centering the shaft 38, and the base portion 13a goes away from the end of the rib 37. Through the rotation in the clockwise direction of the locking member 13, the end portion of the engaging nail 13a moves (displaces) in an arrow Z direction, i.e., to a regulating portion 39a side to abut on the regulating portion 39a. Thus, the engaging nail 13e is prevented from further displacing. Therefore, the engaging relation between the shutter 4 and the engaging nail 13e is maintained, and the shutter 4 does not open.

Figure 19:
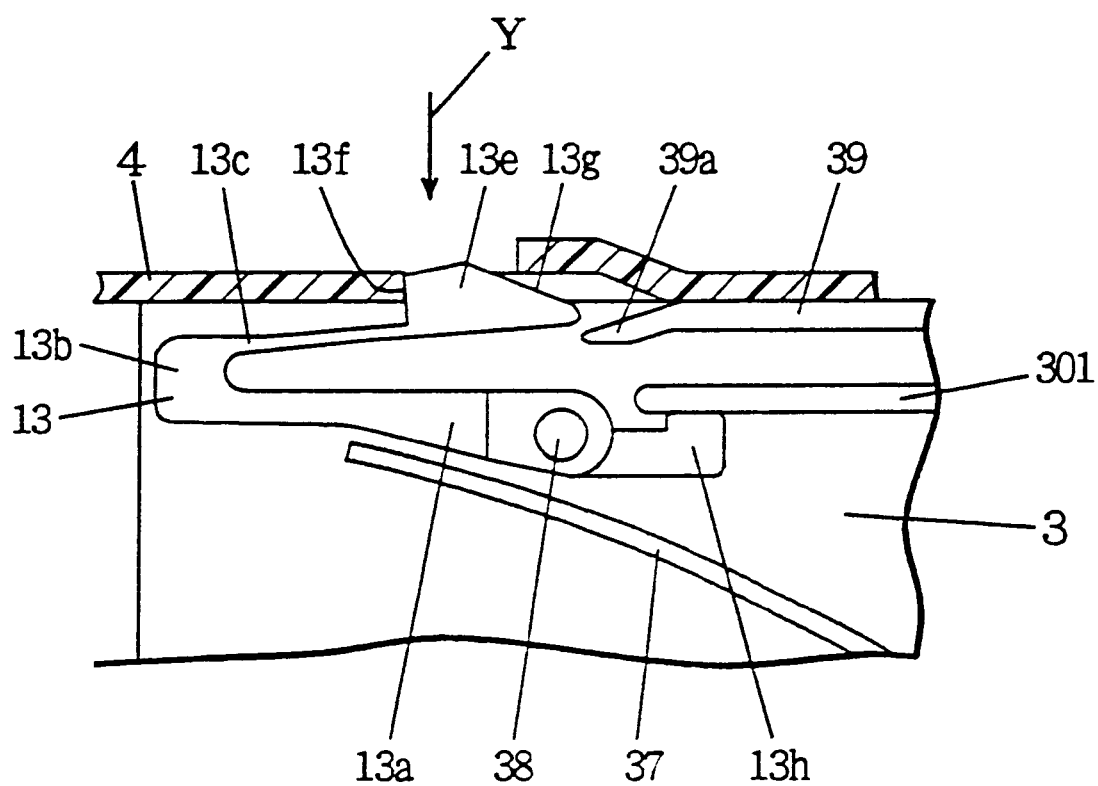
FIG. 19 is a diagram showing another embodiment of the shutter locking mechanism.

FIG. 19 is a diagram showing another embodiment of the shutter locking mechanism. While the locking member 13 is held by the end 37a of the rib 37 in the above described embodiment, an extending portion 13h extending to a side of the spring slide protrusion 301 is provided for the base portion 13a. Therefore, when a force in the lock releasing direction is exerted on the engaging nail 13e of the locking member 13, the extending portion 13h abuts on a side surface of the spring slide protrusion 301 to hold the locking member 13.

While FIG. 19 shows an example that the extending portion 13h abuts on the side surface of the spring slide protrusion 301, the structure is not limited to the spring slide protrusion 301 and the extending portion 13h may abut on another portion of another protrusion protruding inside the case 1.

As shown in FIGS. 9 and 13, the long side portion 41 of the shutter 4 includes a first portion a1 which is opposed to the lower head insert hole 35 and can cover the entire lower head insert hole 35 when the shutter 4 closes, and a second portion a2 which is opposed to the spindle hole 36 and can cover the entire spindle hole 36 when the shutter 4 closes. The diameter of the spindle 36 is selected to be larger than the a position of an end of the upstream side of the opening direction X of the shutter 4 in the first portion a1 is shifted in the downstream side of the opening direction X from a position of an end of the upstream side of the opening direction X of the shutter 4 in the second portion a(2 so that a first width W1 of the first portion (1 is shorter than a second width W2 of the second portion a2. Thus, a position of the end of the upstream side of the opening direction X of the shutter 4 in the short side portion 42 which is contiguous to the first portion a1 of the long side portion 41 is also shifted in the downstream side of the opening direction X from a position of the end of the upstream side of the opening direction X of the shutter 4 in the second portion a2. As a result, when the shutter 4 opens, the edge surface opening 11 and the lower head insert hole 35 are exposed earlier than the spindle hole 36. This is due to the fact that when the disk cartridge is inserted in the drive apparatus, if the edge surface opening 11 and the lower head insert hole 35 are not immediately opened, the upper and lower heads in the drive apparatus side interfere in the shutter 4 to break down. Furthermore, the edge surface opening 11 and the lower head insert hole 35 are rapidly opened, whereby the upper and lower heads on the drive apparatus side can be inserted before the disk cartridge is completely inserted in the drive apparatus, resulting in shortening the depth of the drive apparatus.

Furthermore, as shown in FIG. 2, the upper end of the short side portion 43 of the shutter 4 extends to the same height as that of the highest surface portion 21a of the upper head accommodating portion 21. Therefore, when the shutter 4 opens, the vicinity of the upper end portion of the short side portion 43, as shown in FIG. 5, protrudes upwards from the lowest surface portion 22 between the upper head accommodating portion 21 and the right linear protruding portion 24R. The open state of the shutter 4 may be detected on the drive apparatus side by using the protruding portion of the short side portion 43, and the detected result may be used for a certain control. For example, this can be applied to the control for permitting the loading of the disk cartridge only when the shutter 4 is opened.

Figure 20:
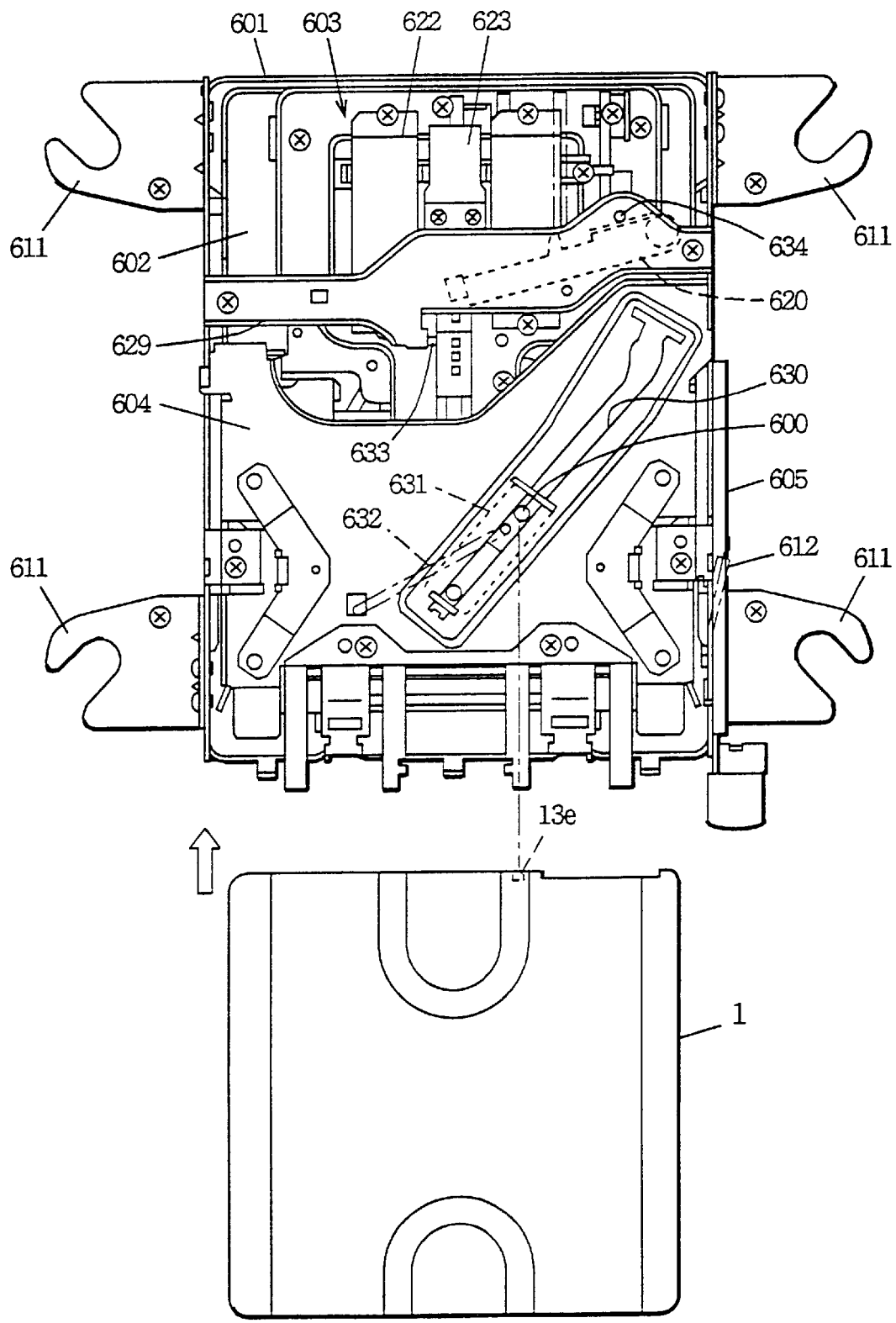
FIG. 20 is a top plan view of the inner structure of the drive apparatus which accepts the disk cartridge of the above embodiment to read (or write and read) information.
Figure 21:
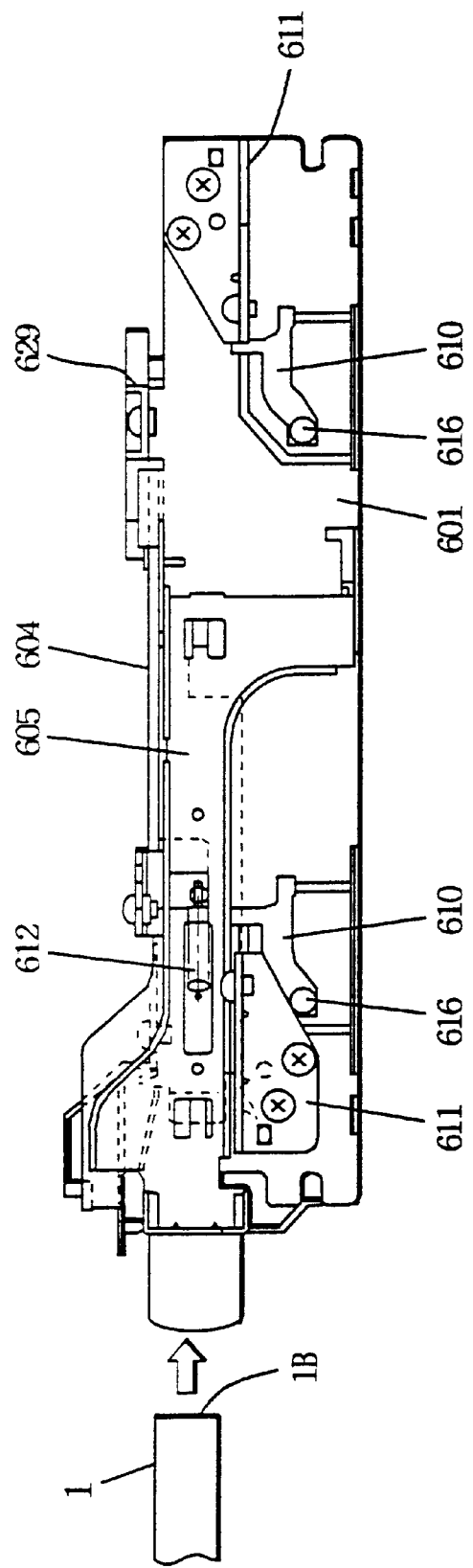
FIG. 21 is a side view of the inner structure of the drive apparatus.
Figure 22:
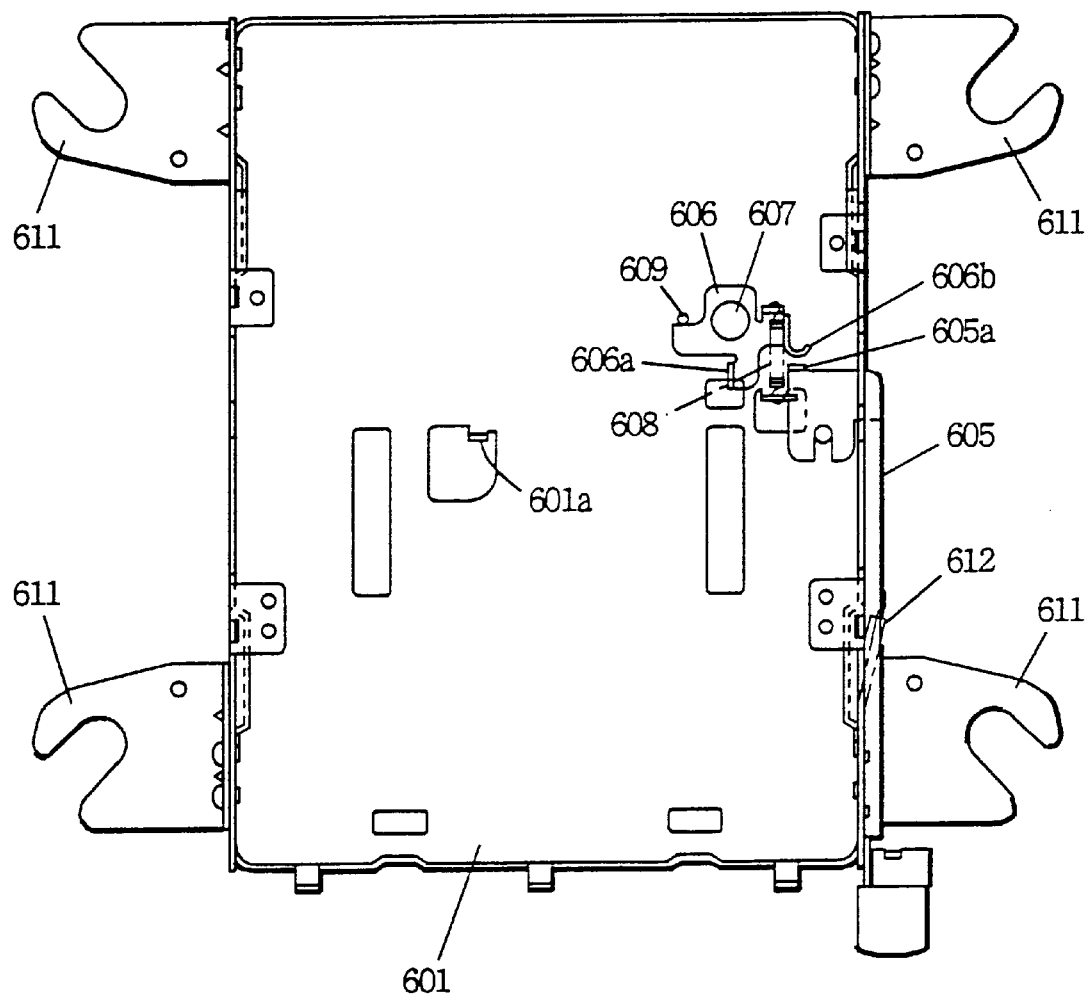
FIG. 22 is a top plan view of a main chassis to be installed in the drive apparatus.
Figure 23:
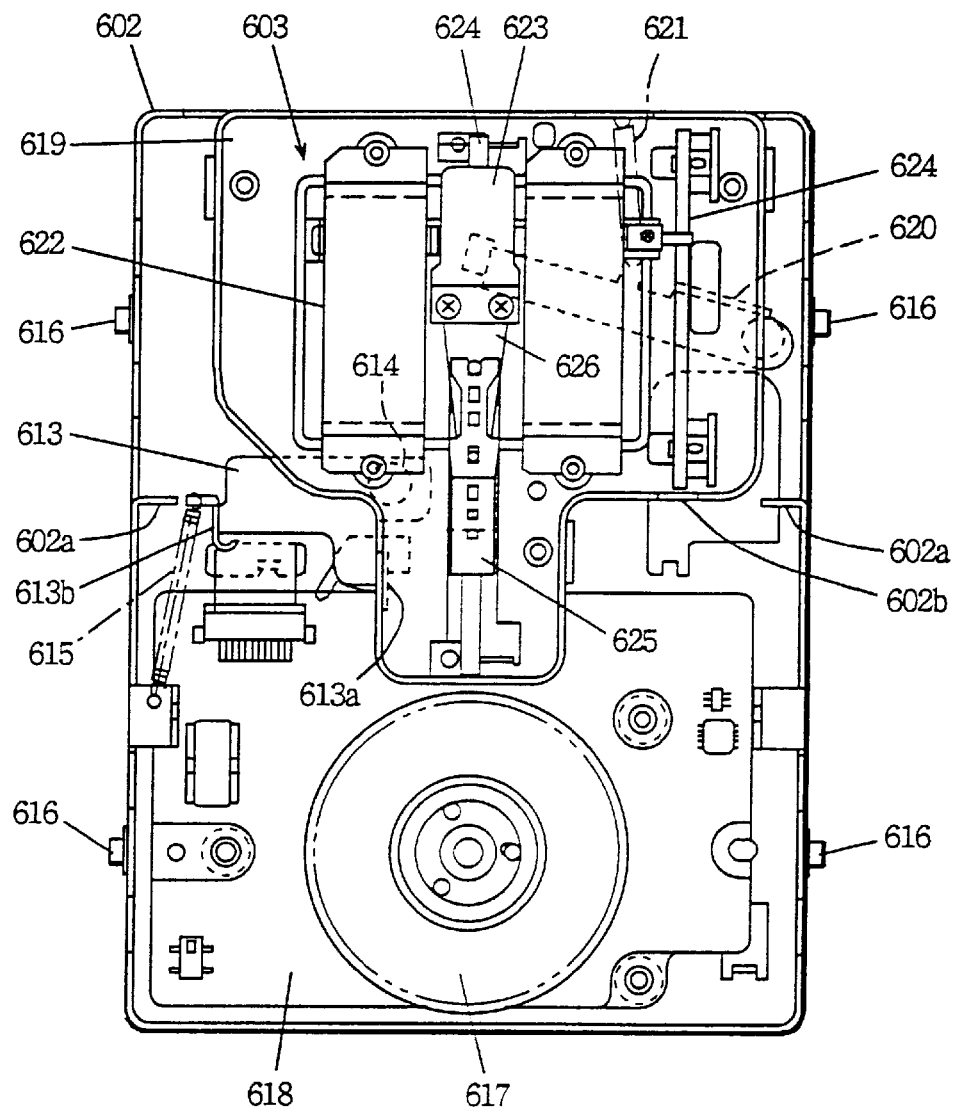
FIG. 23 is a top plan view of a sub chassis to be installed in the drive apparatus.
Figure 24:
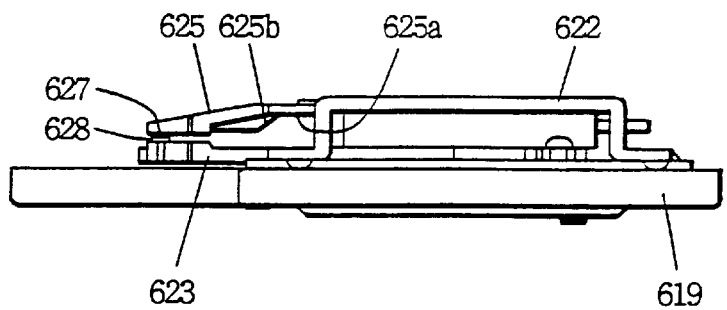
FIG. 24 is a side view of a head transport mechanism provided for the drive apparatus.
Figure 25A:
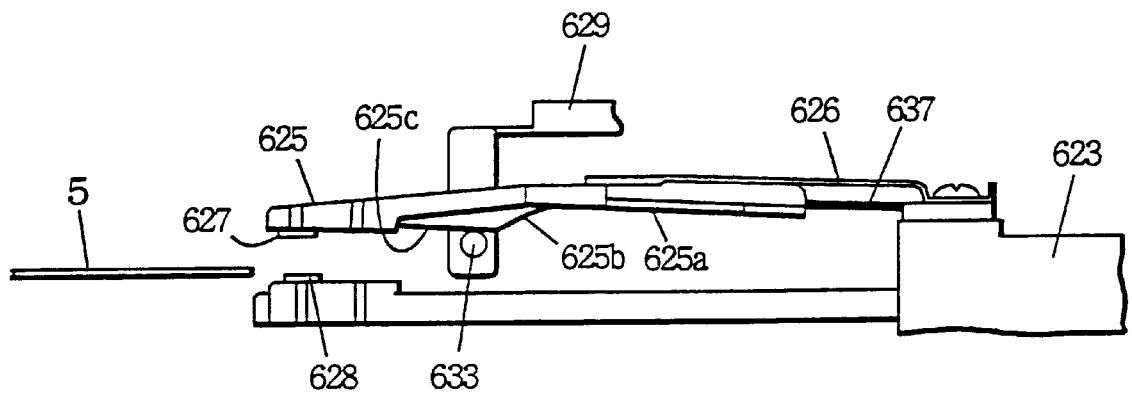
FIGS. 25(a) to 25(c) are diagrams for describing the operation of the head transport mechanism.
Figure 25B:
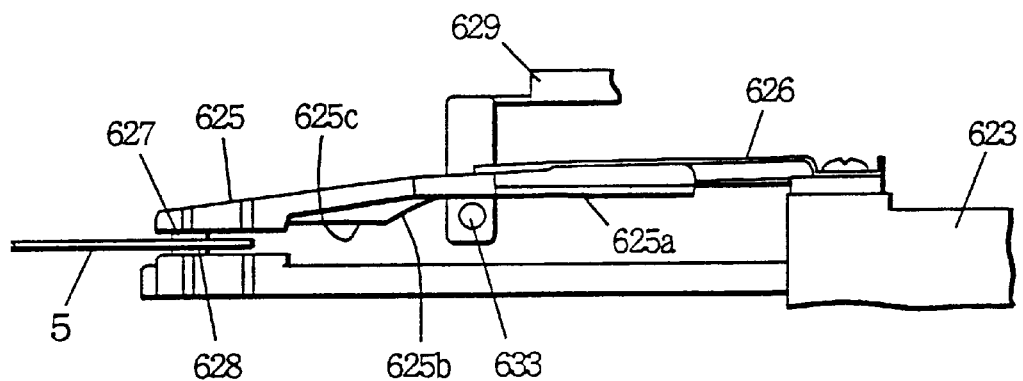
Figure 25C:
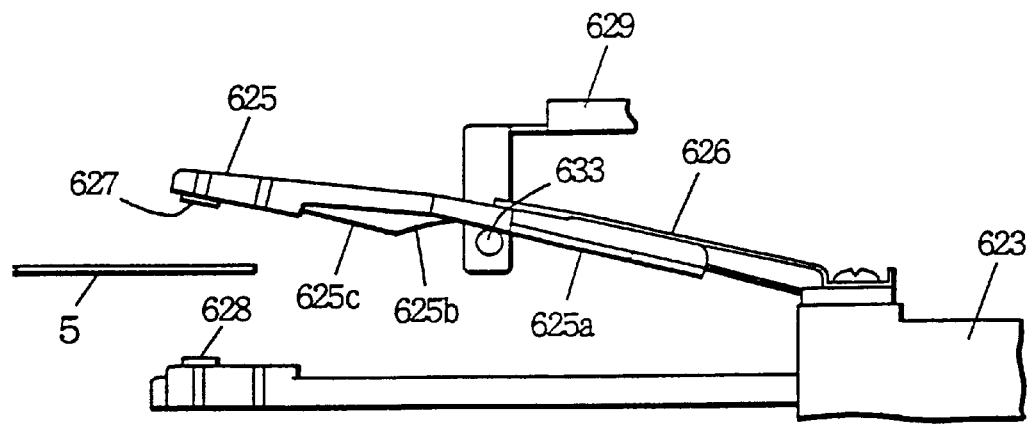

FIG. 20 is a top plan view of the inner structure of the drive apparatus which accepts the disk cartridge of the above embodiment to read (or write and read) information. FIG. 21 is a side view of the inner structure of the drive apparatus. FIG. 22 is a top plan view of a main chassis in the drive apparatus. FIG. 23 is a top plan view of a sub chassis in the drive apparatus. FIG. 24 is a head transport mechanism in the drive apparatus. FIGS. 25(a) to 25(c) are diagrams for describing the operation of the head transport mechanism.

As shown in FIGS. 20 and 21, the drive apparatus comprises a main chassis 601 formed by bending a flat plate, a sub chassis 602 supported on the main chassis 601 capable of moving forward, backward, upward, and downward, a head transport mechanism 603 mounted on the sub chassis 602, a holder 604 fixed at an upper open end of the main chassis 601 and an eject lever 605 installed on a side of the main chassis 601.

As shown in FIG. 22, a stopper 601a is formed by raising, and a first lock lever 606 is rotatably supported by the shaft 607. A locking portion 606a and a receive portion 606b are formed in the first lock lever 606. The first lock lever 606 is energized by a spring 608 in the clockwise direction as shown, and its rotation angle is regulated by a protuberance 609 formed on the main chassis 601. Two cum holes 610 on one side of the both sides of the main chassis 601, i.e., four cum holes 610 are formed on the right and left sides of the main chassis 601 (refer to FIG. 21). A plurality of installation plates 611 formed by bending in an L-shape are fixed to both sides of the main chassis 601. The installation plates 611 can be installed inside a package not shown directly or through a shock-absorbing rubber etc. Furthermore, the eject lever 605 is installed on one side of the main chassis 601, capable of moving forward and backward. The eject lever 605 is energized downward in FIG. 22 by a spring 612, and a releasing portion 605a is opposed to the receive portion 606b of the first lock lever 606.

The sub chassis 602 shown in FIG. 23 is arranged inside the main chassis 601. To the sub chassis 602, a second lock lever 613 is rotatably supported by a shaft 614. The second lock lever 613 is energized by a spring 615 in a counter-clockwise direction as shown by a spring 615. A locking portion 613a capable of engaging the stopper 601a of the main chassis 601 and a receive portion 613b capable of abutting on the disk cartridge are formed in the second lock lever 613. Two guide protuberances 616 on one side of the both sides of the sub chassis 602, i.e., four guide protuberances 616 are formed on the right and left sides of the sub chassis 602. Each guide protuberance 616 is inserted in each cum hole 610 of the main chassis 601. The sub chassis 602 is energized downward in FIG. 20 by a spring not shown, and a pair of receive portions 602a capable of abutting on the disk cartridge and a stopper 602b capable of engaging the locking portion 606a of the first lock lever 606 are respectively formed by bending on the center of both sides and on the inner bottom surface of the sub chassis 602. Furthermore, on the sub chassis 602, a circuit board 618 implementing a spindle motor 617 and its driving circuit components etc., and a supporting plate 619 equipped with the head transport mechanism 603 are fixed, and a driving arm 620 is rotatably journaled. The driving arm 620 is positioned between the sub chassis 602 and the supporting plate 619, and is energized in the clockwise direction as shown.

The head transport mechanism 603 is configured by a linear motor 622 and a carriage 623 driven by the linear motor 622. The carriage 623 can reciprocate along a pair of guide shafts 624 in a vertical direction in FIG. 23, and be energized by the drive arm 620 upward in FIG. 23. As shown in FIG. 25(a), a head support 625 is hinged on the carriage 623 through a leaf spring 637, and the head support 625 is energized to the carriage 623 side by a load spring 626. A first flat portion 625a, an inclined portion 625b and a second flat portion 625c are continuously formed from a rear end to a front end on a bottom surface of the support 625, and to its end, an upper head (for example, a magnetic head) 627 is attached. On the other hand, a lower head (for example, a magnetic head) 628 is attached to the carriage 623, and the lower head 628 is opposed to the upper head 627.

Returning to FIG. 20, the holder 604 and a bridge plate 629 are fixed to an upper opening end of the main chassis 601. A guide hole 630 is formed on an upper surface of the holder 604. A shutter opening/closing member 631 is slidably engaged with the guide hole 630. That is, the shutter opening/closing member 631 comprises the shutter opening/closing pin 600 which protrudes downward in a state of engaging the guide hole 630. The shutter opening/closing member 631 is energized by a spring 632 to a starting end side of the guide hole 630. A drive pin 633 and a control pin 634 are fixed to the bridge plate 629. The control pin 634 extends directly downward to regulate rotation of the driving arm 620. The drive pin 633 crosses under the head support 625 to extend in a horizontal direction. When the sub chassis 602 is in an upper load position, as shown in FIG. 25(a), the drive pin 633 abuts on the second flat portion 625c of the head support 625, and the upper head 627 is separated from the lower head 628. As shown in FIG. 25(b), when the drive pin 633 is on a side of the first flat portion 625a of the head support 625, the upper head 627 is energized by the load spring 626 to a side of the lower head 628. On the other hand, when the sub chassis 602 is in a lower unload position, as shown in FIG. 25(c), the drive pin 633 abuts on the first flat portion 625a of the head support 625, and the upper head 627 and the lower head 628 are separated most.

In the drive apparatus as structured above, when the disk cartridge is not installed, the sub chassis 602 is energized by a spring not shown to the unload position in a lower rear end, and the locking portion 613a of the second lock lever 613 abuts on the stopper 601a of the main chassis 601 to lock the movement of the sub chassis 602. In this situation, the carriage 623 is energized upward in FIG. 23 by the driving arm 620 so as not to move by external vibrations. Furthermore, as shown in FIG. 25(c), the drive pin 633 abuts on the first flat portion 625a of the head support 625, and the upper head 627 and the lower head 628 are separated most.

On the other hand, as shown in FIG. 21, when the case 1 of the disk cartridge is inserted from an insert opening (not shown) provided on a front surface of the drive apparatus in the holder 604, the rear surface 1B of the case 1 presses the receive portion 613b in the course of insertion, whereby the second lock lever 613 rotates in the clockwise direction centering the shaft 614 to release locking of the sub chassis 602. When the case 1 is further inserted in the holder 604, the shutter opening/closing pin 600 abuts on the engaging nail 13e exposed from the engaging window 43 of the shutter 4 of the disk cartridge. When the case 1 is further inserted in the drive apparatus, the shutter opening/closing pin 600 goes into the engaging window 43. Thus, the locking of the shutter 4 is released. When the case 1 is still further inserted in the drive apparatus, the shutter opening/closing pin 600 moves along the guide hole 630 by an insertion force to the right side in FIG. 20. The shutter 4 slides in the opening direction as the shutter opening/closing pin 600 moves.

The shutter 4 completely opens by the shutter opening/closing member 631 moving in the guide hole 630, the rear surface 1B of the case 1 presses the receive portion 602a to move the guide protuberances 616 along the cum holes 610, and the sub chassis 602 goes up while proceeding on the main chassis 601 to reach a loading position. As a result, the first lock lever 606 rotates in the clockwise direction centering the shaft 607 and the locking portion 606a engages the stopper 602b, whereby the sub chassis 602 is locked in the loading position. When the sub chassis 602 proceeds with respect to the main chassis 601, rotation of the driving arm 620 is regulated by the control pin 631 provided on the main chassis 601, whereby the carriage 623 is in a free state not receiving an exerting force from the driving arm 620.

When the disk cartridge is thus completely inserted in the holder 604, the disk cartridge is held at a climbed position by the holder 604, and the spindle motor 617 goes up together with the sub chassis 602 to engage the hub 51 of the disk-like recording medium 5 accommodated in the disk cartridge. Then, the driving of the spindle motor 617 rotates the disk-like recording medium 5 and drives the head transport mechanism 603 according to a direction and size of current supplied to a coil of the linear motor 622. The carriage 623 reciprocates along the guide shaft 624 in a radial direction of the disk-like recording medium 5. In this case, with reciprocation of the carriage 623, the relative position between the lower surface of the head support 625 and the drive pin 633 provided on the bridge plate 629 changes. When the carriage 623 is in a retracting position going away from the disk-like recording medium 5, as shown in 1G. 25 (a), the drive pin 633 abuts on the second flat portion 625c of the head support 625, and the upper head 627 is separated from the lower head 628. On the other hand, when the carriage 623 moves toward the center of the disklike recording medium 5, as shown in FIG. 25(b), the drive pin 633 and the head support 625 do not abut each other, and the upper head 627 is pressed to make contact with the lower head 628 through the disk-like recording medium 5 by an elastic energizing force of the load spring 626, whereby the upper and lower heads 627 and 628 records/reproduces information in the disk-like recording medium 5.

When the disk cartridge is discharged from the drive apparatus, the eject lever 605 is pressed against elasticity of the spring 612. In response, the releasing portion 605a of the eject lever 605 presses the receive portion 606b to rotate the first lock lever 606 in the counter-clockwise direction. As a result, the engagement between the locking portion 606a and the stopper 602b is released, and the sub chassis 602, contrary to the above, goes downward while going backward on the main chassis 601 to be again locked at an unload position. In this situation, while the head transport mechanism 603 goes downward with the sub chassis 602, downward movement of the head support 625 is regulated by the drive pin 633. Therefore, as shown in FIG. 25(c), the drive pin 633 abuts on the first flat portion 625a of the head support 625, and both of the upper head 627 and the lower head 628 are considerably separated from the disk-like recording medium 5. Therefore, when the disk-cartridge is ejected, the upper and lower heads 627 and 628 do not interfere in the disk cartridge, and damage to the upper and lower heads 627 and 628 are prevented.

Figure 26:
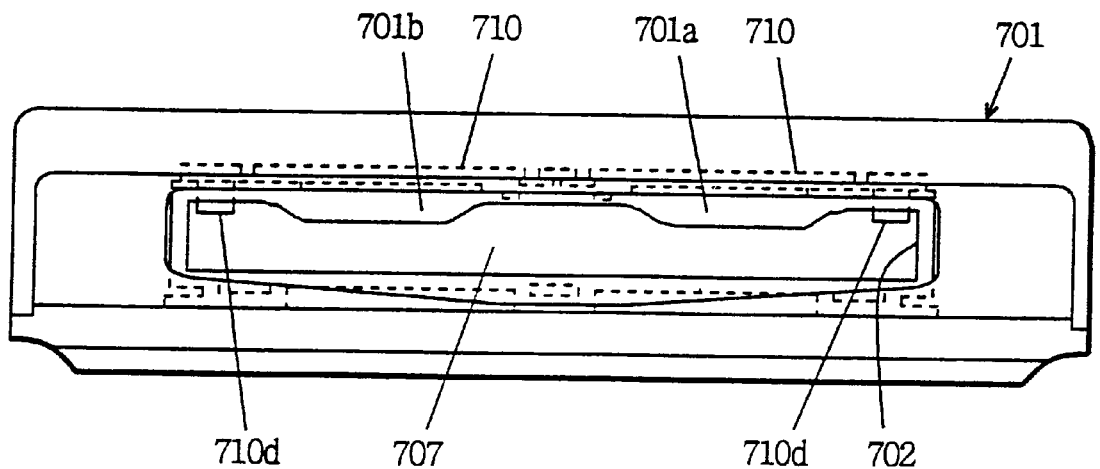
FIG. 26 is a partial front elevational view showing an external structure of the vicinity of a cartridge insert hole of the above drive apparatus.
Figure 27:
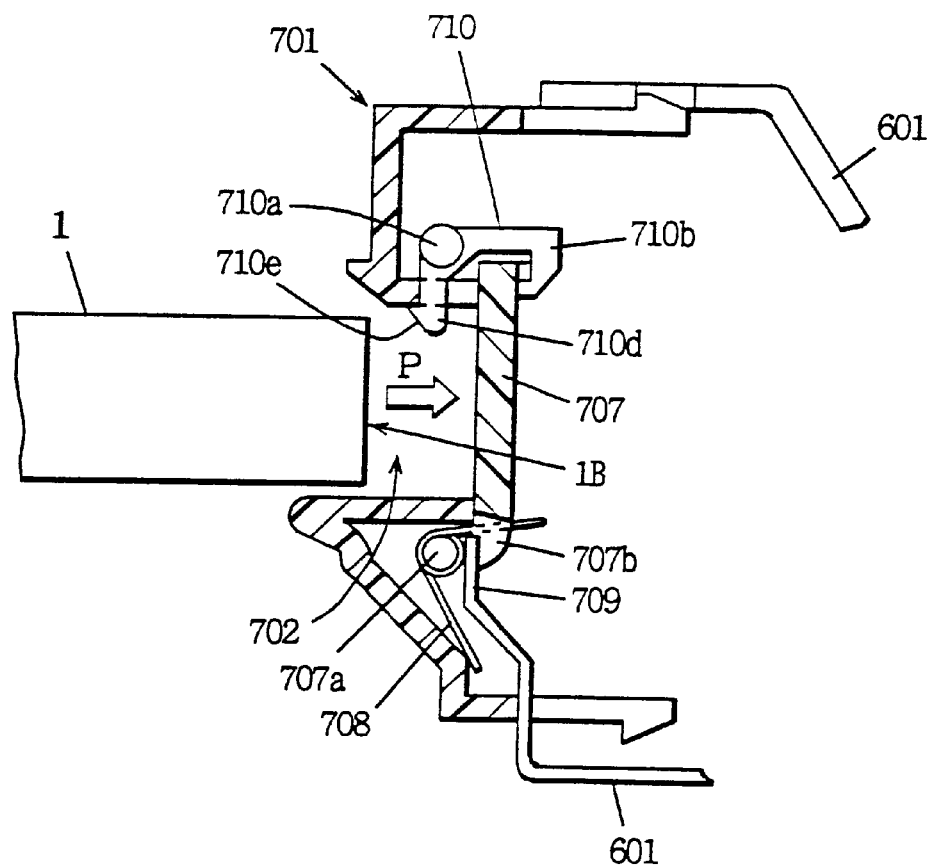
FIG. 27 is a cross-sectional view showing a door opening/closing mechanism in the drive apparatus in a closed position.
Figure 28:
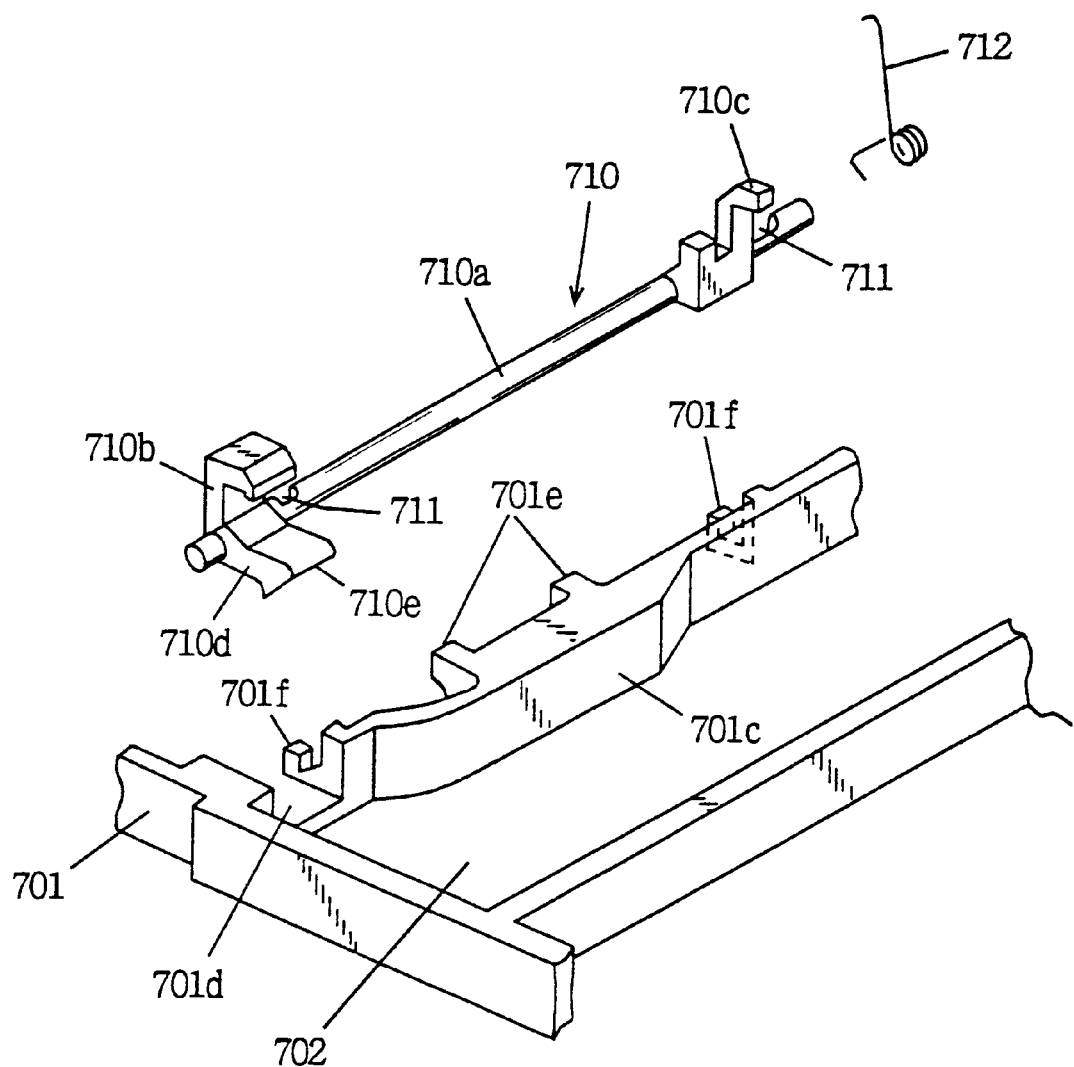
FIG. 28 is an exploded perspective view showing the main portions of the door opening/closing mechanism in the drive apparatus.
Figure 29:
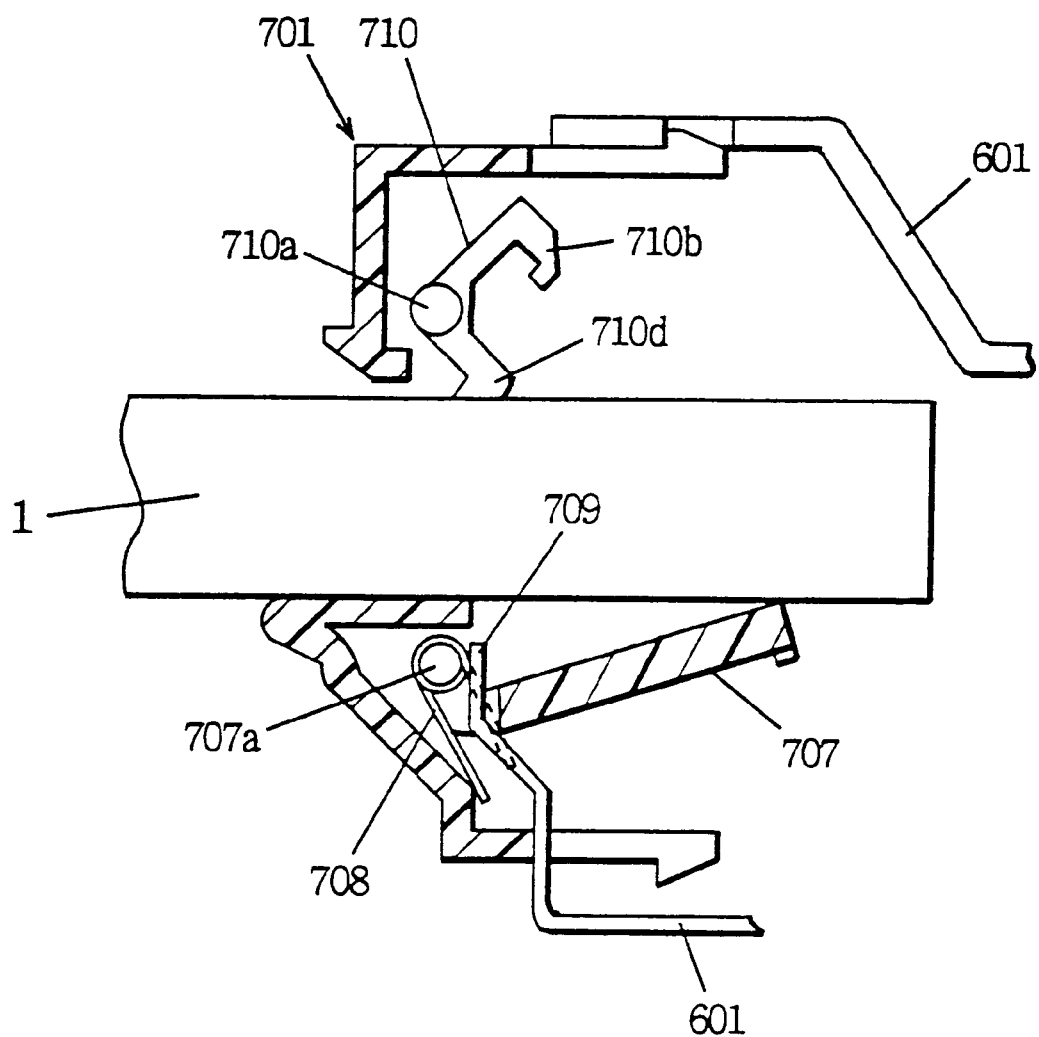
FIG. 29 is a cross-sectional view showing the door opening/closing mechanism in the drive apparatus in an open position.

FIG. 26 is a partial front elevational view showing an external structure of the vicinity of a cartridge insert hole of the above drive apparatus. FIG. 27 is a cross-sectional view showing a close state of a door opening/closing mechanism in the drive apparatus. FIG. 28 is an exploded perspective view showing the main portions of the door opening/closing mechanism in the drive apparatus. FIG. 29 is a cross-sectional view showing an open state of the door opening/closing mechanism in the drive apparatus. The operation of opening/closing a door of the drive apparatus is subsequently described referring to FIGS. 26 to 29.

As shown in FIGS. 26 and 27, a cartridge insert hole 702 is formed on a front surface board 701 which is formed by a synthetic resin etc. The front surface board 701 is snapped to be fixed to a prescribed portion of the main chassis 601 arranged inside the drive apparatus. On the front surface board 701, a pair of protrusions 701a and 701b protruding downward from an upper side of the cartridge insert hole 702 is formed. These protrusions 701a and 701b respectively correspond to a concave shape between the upper head accommodating portion 21 and the right linear protruding portion 24R and a concave shape between the upper head accommodating portion 21 and the left linear protruding portion 24L, both concave portions formed on the upper half 2 of the disk cartridge (refer to FIG. 1). Therefore, when the disk cartridge is correctly inserted from its rear surface 1B in the cartridge insert hole 702, the disk cartridge is inserted to a prescribed position without abutting on the protrusions 701a and 701b. However, being reversely inserted from the front surface 1F, the disk cartridge abuts on the protrusions 701a and 702b, and thus cannot be inserted in the cartridge insert hole 702. Furthermore, in the disk cartridge, a pair of, right and left, convex walls 25 is formed in the vicinity of the front surface 1F of the upper half 2 (refer to FIG. 1). By forming such convex walls 25, the cartridge insert hole 702 is almost completely closed when the disk cartridge is fully inserted in the drive apparatus. This prevents the entry of a foreign substance etc. into the drive apparatus when the disk cartridge is inserted.

A door 707 having a board shape is arranged on the rear side of the front surface board 701. On both lower sides of the door 707, rotating shafts 707a are integrally formed and escape holes 707b are also formed. The rotating shafts 707a are rotatably supported on the rear surface of the front surface board 701. A torsion coil spring 708 is wounded around one of the rotating shafts 707a. Both ends of the torsion coil springs are engaged with the door 707 and the rear surface of the front surface board 701. The door 707 is energized in a direction closing the cartridge insert hole 702 by elasticity of the torsion coil spring 708. As shown in FIG. 27, a stopper 709 is provided on a back of each rotating shaft 707a. In the present drive apparatus, while the stopper 709 is integrally formed on the main chassis 601, the stopper 709 can be formed on other members in the drive apparatus. Though inhibiting the movement of the rotating shaft 707a in a cartridge inserting direction (an arrow P direction) of the rotating shaft 707a, the stopper 709 goes into the escape hole 707b not to prevent the rotation of the door 707.

A pair of locking members 710 is arranged on a rear side of the front surface board 701. The locking members 710 prevent the door 707 from rotating freely. As shown in FIG. 28, the locking member 710 includes a supporting shaft 710a having a pair of notches 711 in its circumferential surface, a pair of locking portions 710b and 710c integrally formed on both ends of the locking portions and pressed portions 710d extending in a perpendicular direction from the locking portion 710b. A taper 710e is formed in a chamfered shape is formed on the pressed portion 710d. On the other hand, a thick pier 701c is formed on the rear surface of the front surface board 701. The pier 701*c* extends along a circumferential edge of the cartridge insert hole 702 except concave portions 701d on both ends of the upper side of the cartridge insert hole 702. A pair of slip stopping portions 701*e* is formed on a position on directly back of the protrusions 701*a* and 701*b* of the pier 701*c*, and short protrusions 701*f* are formed on both sides of the slip stopping portions 701*e*. The inner side of the slip stopping portion 701*e* is formed in a concave shape having approximately the same curved surface as the supporting shaft 710*a*, and similarly, the opposed portion to the protrusion 701*f* is formed in a concave shape having approximately the same curved surface as the supporting shaft 710*a*.

The locking member 710 as configured above is built in the rear side of the front surface board 701, and both ends of a torsion coil spring 712 wound around the supporting shaft 710*a* engage with the vicinity of the locking portion 710*c* and the upper portion of the front surface board 701. Thus, with the supporting shaft 710*a* as a fulcrum of rotation, the locking portions 710*b* and 710*c* are energized in a direction engaging the upper end of the door 707.

In the door opening/closing mechanism as configured above, when the disk cartridge is not installed in the drive apparatus, the cartridge insert hole 702 is closed by the door 707, and the locking member 710 prevents the door 707 from rotating freely. Therefore, for example, if the door 707 is pressed by something other than disk cartridge, such as a finger or an implement for writing, the rotation of the door 707 is prevented by the locking member 710, and it is reliably possible to inhibit a foreign substance from entering the inside of the drive apparatus from the cartridge insert hole 702. Moreover, when a disk cartridge having a different shape from that of the normal disk cartridge is inserted in the cartridge insert hole 702, the disk cartridge abuts on the protrusions 701*a* and 701*b*, and cannot press the pressed portion 710*d*. Therefore, the rotation of the door 707 is still prevented by the locking member 710 and error insertion of other cartridges is inhibited. Even if an unauthorized disk cartridge presses the door 707, since a pressing force is received by both upper and lower sides of the door 707 through the locking portions 710*b* and 710*c* of the locking member 710 and the stopper 709, the rotating shaft 707*a* of the door 707 is hard to break.

In use, when the disk cartridge is pressed into the cartridge insert hole 702 in the arrow P direction in FIG. 27, pressed portions 710*d* exposed at both upper and lower ends of the cartridge insert hole 702 are pressed by the left and right linear protruding portions 24L and 24R of the disk cartridge, whereby the locking member 710 rotates taking supporting shaft 710*a* as a fulcrum, and the engagement between the locking portion 710*b*, 710*c* and the door 707 is released. At this time, since the pressed portion 710*d* and the left and right linear protruding portions 24L and 24R abut each other on the taper 710*e*, when disk cartridge more or less is displaced in the cartridge insert hole 702, the locking member 710 reliably rotates. When the disk cartridge is further pressed to press the door 707, as shown in FIG. 29, the door 707 rotates taking the rotating shaft 707*a* as a fulcrum, and the disk cartridge is held to the main chassis 601 in the drive apparatus.

Furthermore, when the disk cartridge is discharged from the drive apparatus to the cartridge insert hole 702 by operating the eject lever 605, contrary to the above, the door 707 rotates in a reverse direction by an exerting force of the torsion coil spring 708 and the locking member 710 also rotates in a reverse direction by an exerting force of the torsion coil spring 712. As a result, as shown in FIG. 27, the cartridge insert hole 702 is again closed by the door 707, and the free rotation of the door 707 is inhibited by the locking member 710.

Figure 30:
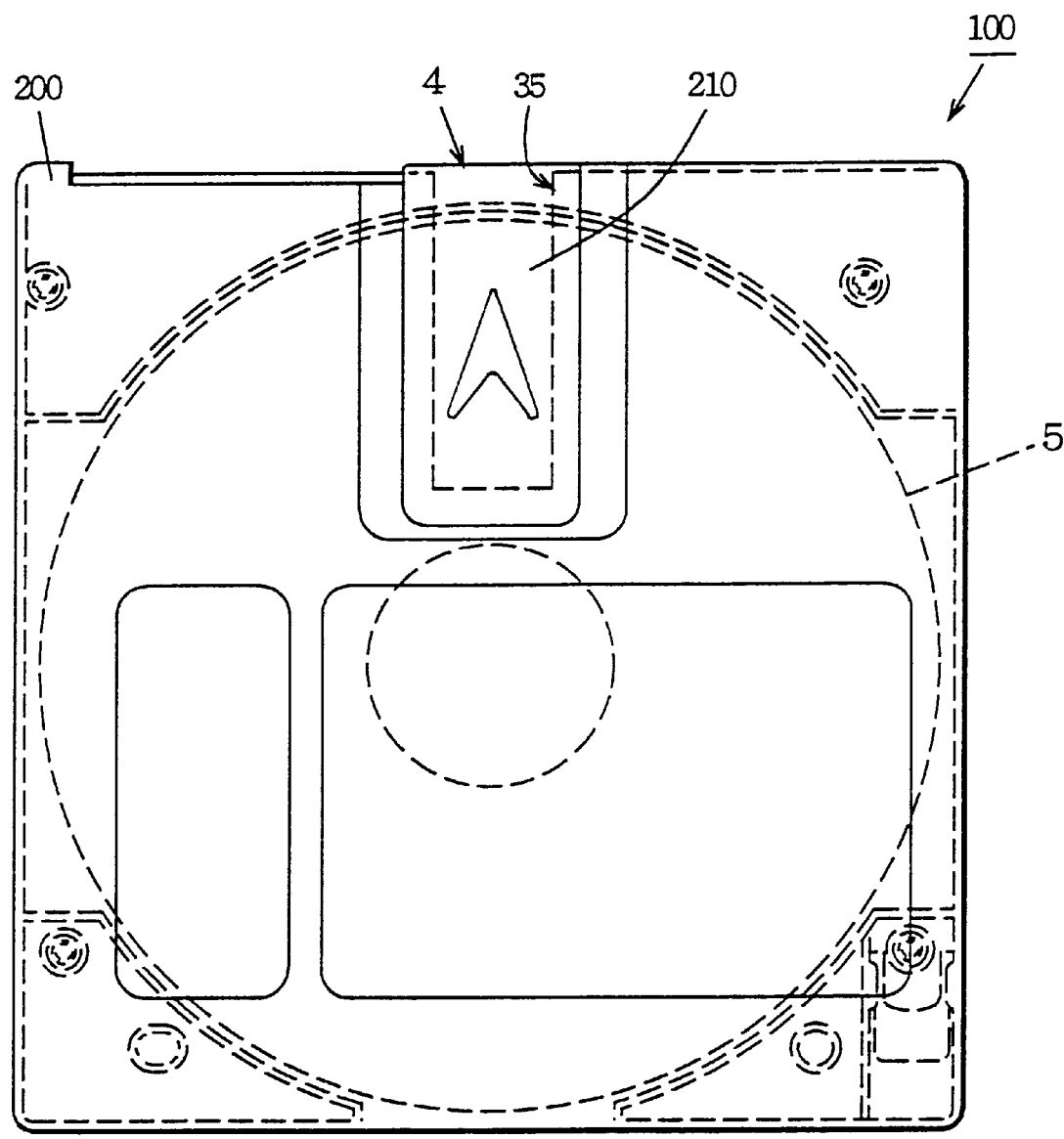
FIG. 30 is a top plan view showing a disk cartridge according to a second embodiment of the present invention.
Figure 31:
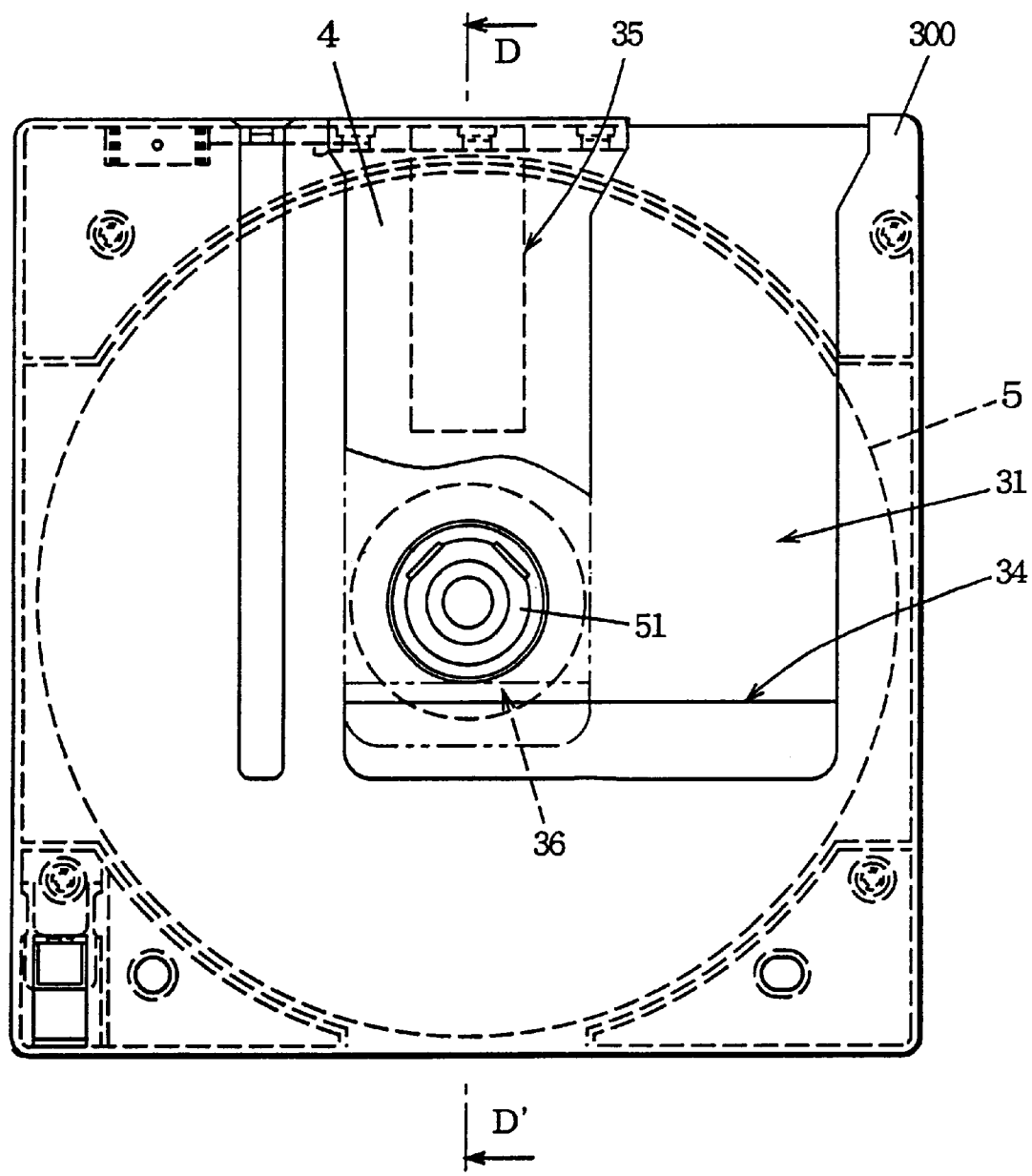
FIG. 31 is a bottom plan view showing the disk cartridge according to the second embodiment.
Figure 32:
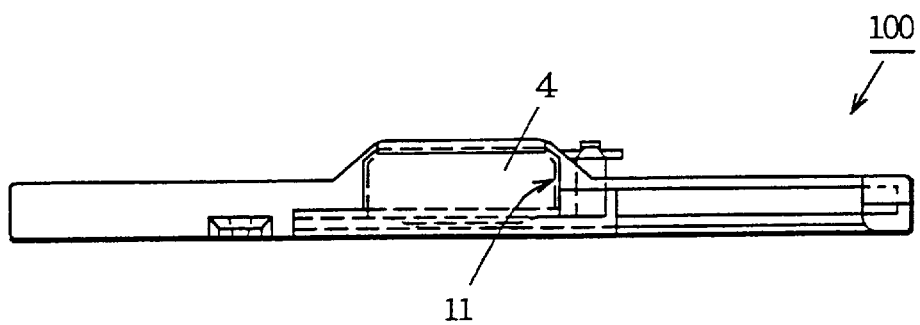
FIG. 32 is a rear elevational view of the disk cartridge according to the second embodiment.
Figure 33:
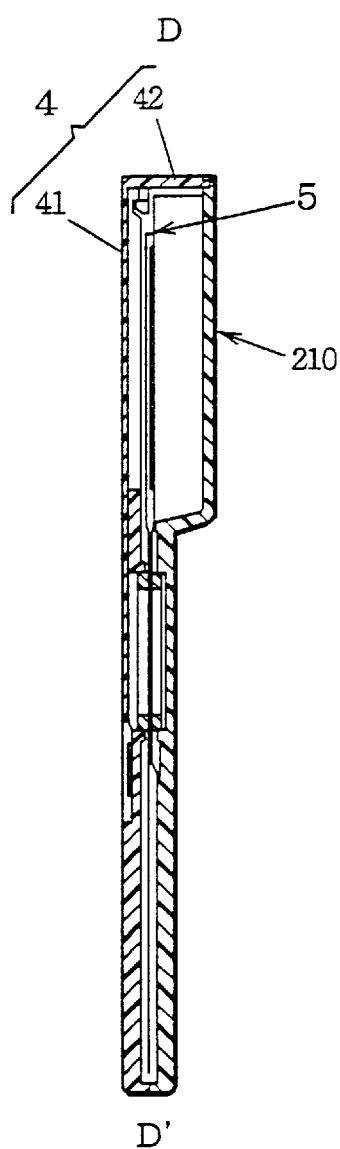
FIG. 33 is a cross-sectional view along a line D–D' shown in FIG. 31.

FIG. 30 is a top plan view showing a state that the disk cartridge according to a second embodiment of the present invention is seen from directly above. FIG. 31 is a bottom plan view showing a state that the disk cartridge according to the second embodiment is seen from directly below. FIG. 32 is a rear elevational view of the disk cartridge according to the second embodiment. FIG. 33 is a cross-sectional view along a line D–D' shown in FIG. 31. The disk cartridge according to the second embodiment is subsequently described referring to FIGS. 30 to 33.

As in the disk cartridge of the first embodiment, in the disk cartridge of the second embodiment, a case 100 is configured by opposing an upper half 200 to a lower half 300. The disk-like recording medium 5 is rotatably accommodated in the case 100. The shutter 4 is slidably provided on the rear surface of the case 100 for opening and closing the edge surface opening 11 and the lower head insert hole 35.

In the disk cartridge of the present embodiment, an upper head accommodating portion 210 whose structure is the same as that of the upper head accommodating portion 21 in the disk cartridge of the first embodiment is formed on an upper surface of the upper half 200. That is, the upper head accommodating portion 210 is formed larger more than other portions of the upper surface of the case 100. However, the corresponding portions to the enlarged portion 23, the right linear protruding portion 24R and the left linear protruding portion 24L which are provided in the first embodiment are not formed on the upper surface of the case 100, which is different from the first embodiment. Since other portions are the same as in the first embodiment, the same reference numbers are provided for the corresponding parts and its description is omitted.

While the invention has been described in detail, the foregoing description is in all aspects illustrative and not restrictive. It is understood that numerous other modifications and variations can be devised without departing from the scope of the invention.

What is claimed is:

1. A disk cartridge for use in a drive apparatus having an upper head and an opposedly arranged lower head, said drive apparatus operable to read recorded information from a disk-like recording medium inserted between the upper head and the lower head, said disk cartridge having a flat rectangular shape with the disk-like recording medium rotatably held in a space thereof, comprising:

a case having an upper half and an opposed lower half which together define an outer shape of the disk cartridge;

a lower head insert hole formed in said lower half so as to extend from an approximate center of a prescribed edge surface to a center portion of the disk cartridge;

an upper head accommodating portion formed in said upper half on an upper portion directly overlying said lower head insert hole, said upper head accommodating portion having an enlarged shape compared with other portions of a main surface of the upper half, said upper head accommodating portion having on said prescribed edge surface an edge surface opening which connects with said lower head insert hole and into which said upper head can be inserted; and a shutter formed in an approximately L-shaped cross-section having a short side portion and a long side portion perpendicular to each other, said shutter being operable to close said edge surface opening with the short side portion, to close said lower head insert hole with the long side portion, and to slidably open when said case is inserted in said drive apparatus.

2. The disk cartridge according to claim 1, comprising:

an elastic member accommodated in a vicinity of said lower head insert hole in a space formed between said upper half and said lower half, said elastic member operable to bias said shutter toward a closed position when said case is not installed in said drive apparatus.

3. The disk cartridge according to claim 2, wherein said elastic member is placed on the downstream side of an opening direction of said shutter.

4. The disk cartridge according to claim 3, wherein said elastic member is composed of a spring member, said shutter is provided with a spring receipt portion for receiving one end of said spring member and an engaging window with which a shutter opening/closing member engages, the spring receipt portion is placed nearer to the center of the prescribed edge surface of the case than the engaging window.

5. The disk cartridge according to claim 1, wherein said upper head accommodating portion has a trapezoidal shape when said case is viewed from said prescribed edge surface.

6. The disk cartridge according to claim 1, wherein a pair of linear protruding portions extending along respective edge surfaces perpendicular to said prescribed edge surface is formed on an outer surface of said upper half.

7. The disk cartridge according to claim 6, wherein a height of a highest surface portion of the pair of linear protruding portions formed on said upper half is selected to be approximately the same height of a highest surface portion of said upper head accommodating portion.

8. The disk cartridge according to claim 6, comprising:

an enlarged portion is formed having the same width and height as that of said upper head accommodating portion on an outer surface of said upper half and in a vicinity of an end on a reverse direction side to an inserting direction to said drive apparatus.

9. The disk cartridge according to claim 8, wherein a convex wall extending respectively from said enlarged portion to said pair of linear protruding portions is formed on the outer surface of said upper half and in the vicinity of the end on the reverse direction side to the inserting direction to said drive apparatus.

10. The disk cartridge according to claim 1, wherein a front end of the short side portion of said shutter extends to a position in a vicinity of a highest surface portion of said upper head accommodating portion, and protrudes through a surface of portions of the main surface of said upper half lower than the upper head accommodating portion when said shutter is opened.

11. The disk cartridge according to claim 1, wherein a thin portion thinner than other portions of said shutter is formed in a vicinity of a front end of the long side portion of said shutter; and an engaging hole is formed on said lower half for engagingly holding said shutter by inserting the thin portion of said long side portion.

12. The disk cartridge according to claim 1, wherein a hub is formed to be chucked by a spindle of said drive apparatus in a center portion of said disk-like recording medium;

a spindle hole is formed in the approximate center portion of said lower half, exposing said hub and having a diameter larger than a diameter of the hub;

the long side portion of said shutter includes a first portion which is contiguous to the short side portion, is opposed to said lower head insert hole and can cover an entire lower head insert hole when the shutter closes, and a second portion which is opposed to said spindle hole and can cover the entire spindle hole when the shutter closes; and a position of an end in a reverse direction to an opening direction at said first portion of said long side portion and a position of an end in the reverse direction to the opening direction of said short side portion are shifted to a side of the opening direction from a position of the end in a reverse direction to the opening direction at said second portion.

13. The disk cartridge according to claim 1, wherein a rib is formed in an inner surface of said upper half along a circumferential direction inward from a circumference of said disk-like recording medium.

14. A disk cartridge for use in a drive apparatus having an upper head and an oppositely arranged lower head, said drive apparatus operable to read recorded information from a disk-like recording medium inserted between the upper head and the lower head, said disk cartridge having a flat rectangular shape, with the disk-like recording medium rotatably held in a space thereof, comprising:

a case having an upper half and an opposed lower half which together define an outer shape of the disk cartridge;

a lower head insert hole formed in said lower half so as to extend from an approximate center of a prescribed edge surface to a center direction of the disk cartridge;

an upper head accommodating portion formed in said upper half on an upper portion directly overlying said lower head insert hole, said upper head accommodating portion having an enlarged shape compared with other portions of a main surface of the upper half, said upper head accommodating portion having on said prescribed edge surface an edge surface opening which connects with said lower head insert hole and into which said upper head can be inserted;

a shutter formed in an approximately L-shaped cross-section having a short side portion and a long side portion perpendicular to each other, said shutter being operable to close said edge surface opening with the short side portion, to close said lower head insert hole with the long side portion, and to slidably open when said case is inserted in said drive apparatus in a state of being interposed between said upper half and said lower half; and an elastic member accommodated in a vicinity of said lower head insert hole in a space formed between said upper half and said lower half, and elastically biasing said shutter in a closing direction when said case is not installed in said drive apparatus.

* * * * *